(12) United States Patent
Groen et al.

(10) Patent No.: US 7,885,320 B1
(45) Date of Patent: Feb. 8, 2011

(54) MGT/FPGA CLOCK MANAGEMENT SYSTEM

(75) Inventors: Eric D. Groen, Ankeny, IA (US);
Charles W. Boecker, Ames, IA (US);
William C. Black, Ames, IA (US); Scott A. Irwin, Ames, IA (US); Joseph Neil Kryzak, Ames, IA (US)

(73) Assignee: XILINX, Inc., San Jose, CA (US)

( * ) Notice: Subject to any disclaimer, the term of this patent is extended or adjusted under 35 U.S.C. 154(b) by 1456 days.

(21) Appl. No.: 10/660,254

(22) Filed: Sep. 11, 2003

(51) Int. Cl.
*H04B 1/38* (2006.01)
(52) U.S. Cl. .................. 375/219; 375/260; 375/316; 375/349; 375/354; 375/356; 375/373; 375/376; 375/377
(58) Field of Classification Search .............. 375/219, 375/316, 354–357, 362, 371, 373–376, 349–260, 375/347, 377; 455/73; 710/1
See application file for complete search history.

(56) References Cited

U.S. PATENT DOCUMENTS

| | | | | |
|---|---|---|---|---|
| 5,251,210 A * | 10/1993 | Mann et al. | ................ | 370/519 |
| 5,388,100 A * | 2/1995 | Ohtsuka | ................ | 370/334 |
| 5,519,693 A * | 5/1996 | Galuszka et al. | .............. | 370/276 |
| 5,920,897 A * | 7/1999 | Jin et al. | ................ | 711/167 |
| 5,987,540 A * | 11/1999 | Hashiguchi | ............... | 710/60 |
| 7,493,095 B2 | 2/2000 | Chuang et al. | | |
| 6,167,077 A * | 12/2000 | Ducaroir et al. | ............. | 375/219 |
| 6,288,656 B1 * | 9/2001 | Desai | ................ | 341/100 |
| 6,341,142 B2 * | 1/2002 | Ducaroir et al. | ............. | 375/219 |
| 6,408,011 B1 * | 6/2002 | Nakatsugawa | ............. | 370/503 |
| 6,463,109 B1 * | 10/2002 | McCormack et al. | ....... | 375/355 |
| 6,516,952 B1 * | 2/2003 | Wang et al. | .............. | 209/227 |
| 6,522,167 B1 | 2/2003 | Ansari et al. | | |
| 6,541,991 B1 | 4/2003 | Hornchek et al. | | |
| 6,580,072 B1 | 6/2003 | Chang et al. | | |
| 6,617,877 B1 | 9/2003 | Cory et al. | | |
| 6,618,358 B2 * | 9/2003 | Mahajan et al. | ............. | 370/242 |
| 6,618,455 B1 * | 9/2003 | Maeda et al. | ............... | 375/354 |
| 6,662,285 B1 | 12/2003 | Sastry et al. | | |
| 6,687,260 B1 * | 2/2004 | Peace | .......................... | 370/450 |
| 6,693,452 B1 | 2/2004 | Ansari et al. | | |

(Continued)

OTHER PUBLICATIONS

Jordan, U.S. Appl. No. 60/429,941, filed Nov. 29, 2002.*

(Continued)

*Primary Examiner*—Mohammad H Ghayour
*Assistant Examiner*—Sophia Vlahos
(74) *Attorney, Agent, or Firm*—Timothy W. Markison; Kin-Wah Tong; Thomas George

(57) ABSTRACT

A device and a method for processing high data rate serial data includes circuitry for recovering a clock based on the high data rate input data stream and for providing the recovered clock to a circuit portion, for example, a portion of a field programmable gate array fabric, to enable the circuit portion to use either a reference clock or the recovered clock for subsequent processing. The invention specifically allows for different circuitry portions to utilize different clocks, including different recovered clocks, for corresponding functions that are being performed. Applications for the present invention are many but include multi-gigabit transceiver, switching devices, and protocol translation devices. More generally, the device and method provide for application specific clock references to be utilized in order to minimize or eliminate timing mismatch in serial data processing.

17 Claims, 18 Drawing Sheets

U.S. PATENT DOCUMENTS

| | | | |
|---|---|---|---|
| 6,735,756 B1 | 5/2004 | Linn et al. | |
| 6,740,936 B1 | 5/2004 | Gitlin et al. | |
| 6,753,722 B1 | 6/2004 | Kondapalli et al. | |
| 6,754,882 B1 | 6/2004 | Sanchez et al. | |
| 6,760,898 B1 | 7/2004 | Sanchez et al. | |
| 6,772,405 B1 | 8/2004 | Gan et al. | |
| 6,781,407 B2 | 8/2004 | Schultz | |
| 6,798,239 B2 | 9/2004 | Douglass et al. | |
| 6,798,744 B1* | 9/2004 | Loewen et al. | 370/235 |
| 6,810,458 B1 | 10/2004 | Bazargan et al. | |
| 6,819,156 B1 | 11/2004 | Nix | |
| 6,820,248 B1 | 11/2004 | Gan | |
| 6,839,874 B1 | 1/2005 | Fang | |
| 6,844,752 B1 | 1/2005 | Cascella | |
| 6,874,107 B2 | 3/2005 | Lesea | |
| 6,876,186 B1 | 4/2005 | Gupta | |
| 6,886,092 B1 | 4/2005 | Douglass et al. | |
| 6,891,384 B2 | 5/2005 | Mardi et al. | |
| 6,911,842 B1 | 6/2005 | Ghia et al. | |
| 6,934,922 B1 | 8/2005 | Burnley | |
| 6,941,538 B2 | 9/2005 | Hwang et al. | |
| 6,960,933 B1 | 11/2005 | Cory et al. | |
| 6,961,919 B1 | 11/2005 | Douglass | |
| 6,963,219 B1 | 11/2005 | Ghia et al. | |
| 6,970,013 B1 | 11/2005 | Cory | |
| 6,973,405 B1 | 12/2005 | Ansari | |
| 6,976,160 B1 | 12/2005 | Yin et al. | |
| 6,978,433 B1 | 12/2005 | Gan et al. | |
| 6,983,405 B1 | 1/2006 | Herron et al. | |
| 6,996,758 B1 | 2/2006 | Herron et al. | |
| 6,996,796 B2 | 2/2006 | Sanchez et al. | |
| 7,007,121 B1 | 2/2006 | Ansari et al. | |
| 7,020,860 B1 | 3/2006 | Zhao et al. | |
| 7,038,466 B1 | 5/2006 | Gupta | |
| 7,058,921 B1 | 6/2006 | Hwang et al. | |
| 7,076,595 B1 | 7/2006 | Dao et al. | |
| 7,080,300 B1 | 7/2006 | Herron et al. | |
| 7,085,973 B1 | 8/2006 | Yin | |
| 7,088,767 B1 | 8/2006 | Cory | |
| 7,092,865 B1 | 8/2006 | Burnley et al. | |
| 7,099,426 B1 | 8/2006 | Cory et al. | |
| 7,109,734 B2 | 9/2006 | Yuan et al. | |
| 7,109,783 B1 | 9/2006 | Kondapalli et al. | |
| 7,111,217 B1 | 9/2006 | Schultz | |
| 7,111,220 B1 | 9/2006 | Sasaki et al. | |
| 7,116,251 B1 | 10/2006 | Groen et al. | |
| 7,124,382 B1 | 10/2006 | Eccles et al. | |
| 7,138,835 B1 | 11/2006 | Gaboury | |
| 7,142,005 B1 | 11/2006 | Gaboury | |
| 7,142,014 B1 | 11/2006 | Groen et al. | |
| 7,180,972 B1* | 2/2007 | Venkata et al. | 375/371 |
| 7,187,709 B1 | 3/2007 | Menon et al. | |
| 7,194,600 B2 | 3/2007 | Douglass et al. | |
| 7,196,545 B1 | 3/2007 | Groen et al. | |
| 7,216,328 B2 | 5/2007 | Hwang et al. | |
| 7,224,760 B1 | 5/2007 | Rokhsaz et al. | |
| 7,224,952 B2 | 5/2007 | Boecker et al. | |
| 7,255,278 B2 | 5/2007 | Baxter el at. | |
| 7,227,375 B2 | 6/2007 | Groen et al. | |
| 7,231,621 B1 | 6/2007 | Herron et al. | |
| 7,254,794 B1 | 8/2007 | Burnley | |
| 7,260,688 B1 | 8/2007 | Baxter et al. | |
| 7,266,632 B2 | 9/2007 | Dao et al. | |
| 7,269,805 B1 | 9/2007 | Ansari et al. | |
| 7,277,643 B2* | 10/2007 | Baba et al. | 398/155 |
| 7,306,977 B1 | 12/2007 | Verma et al. | |
| 7,379,517 B1 | 5/2008 | Black | |
| 7,379,855 B1 | 5/2008 | Oda et al. | |
| 7,382,823 B1 | 6/2008 | Cory | |
| 7,406,557 B2 | 7/2008 | Dao et al. | |
| 7,406,670 B1 | 7/2008 | Ansari et al. | |
| 7,420,392 B2 | 9/2008 | Schultz et al. | |
| 7,424,553 B1 | 9/2008 | Borrelli et al. | |
| 7,426,252 B1 | 9/2008 | Chuang et al. | |
| 7,480,786 B1 | 1/2009 | Crabill | |
| 7,489,152 B2 | 2/2009 | Yuan et al. | |
| 7,509,614 B2 | 3/2009 | Hwang et al. | |
| 7,526,689 B1 | 4/2009 | Yin | |
| 7,535,962 B1 | 5/2009 | Black | |
| 7,539,848 B1 | 5/2009 | Douglass et al. | |
| 7,546,499 B1 | 6/2009 | Shafer et al. | |
| 7,552,415 B2 | 6/2009 | Sanchez et al. | |
| 7,724,016 B2 | 5/2010 | Yuan et al. | |
| 7,724,903 B1 | 5/2010 | Kryzak et al. | |
| 7,725,868 B1 | 5/2010 | Verma et al. | |
| 2001/0043648 A1* | 11/2001 | Ducaroir et al. | 375/224 |
| 2002/0075981 A1* | 6/2002 | Tang et al. | 375/372 |
| 2003/0112798 A1* | 6/2003 | Ziegler et al. | 370/366 |
| 2004/0014448 A1* | 1/2004 | Talbot | 455/278.1 |
| 2004/0133734 A1* | 7/2004 | Jordan et al. | 711/103 |
| 2005/0025496 A1* | 2/2005 | Akita et al. | 398/140 |
| 2005/0053179 A1* | 3/2005 | Knapp et al. | 375/354 |
| 2005/0123236 A1* | 6/2005 | Ko et al. | 385/24 |

OTHER PUBLICATIONS

"T1/E1 Framer and Line Interface Bt8370" Datasheet by Mindspeed, Dec. 2001.*
U.S. Appl. No. 10/660,234, filed Sep. 11, 2003, Boecker.
U.S. Appl. No. 10/660,449, filed Sep. 11, 2003, Cory et al.
U.S. Appl. No. 10/660,191, filed Sep. 11, 2003, Kryzak et al.
U.S. Appl. No. 10/660,062, filed Sep. 11, 2003, Groen et al.
U.S. Appl. No. 10/660,448, filed Sep. 11, 2003, Groen et al.
U.S. Appl. No. 10/659,803, filed Sep. 11, 2003, Black et al.
U.S. Appl. No. 10/659,819, filed Sep. 11, 2003, Groen et al.
U.S. Appl. No. 10/659,971, filed Sep. 11, 2003, Boecker et al.
U.S. Appl. No. 10/659,972, filed Sep. 11, 2003, Shafer.
U.S. Appl. No. 10/661,016, filed Sep. 11, 2003, Groen et al.
U.S. Appl. No. 10/659,979, filed Sep. 11, 2003, Kryzak et al.
U.S. Appl. No. 10/659,974, filed Sep. 11, 2003, Kryzak et al.
U.S. Appl. No. 10/660,159, filed Sep. 11, 2003, Groen et al.
U.S. Appl. No. 10/660,016, filed Sep. 11, 2003, Jenkins.
U.S. Appl. No. 10/659,973, filed Sep. 11, 2003, Groen et al.
U.S. Appl. No. 10/660,190, filed Sep. 11, 2003, Groen.
U.S. Appl. No. 10/659,916, filed Sep. 11, 2003, Black et al.
U.S. Appl. No. 10/659,978, filed Sep. 11, 2003, Groen et al.
U.S. Appl. No. 10/660,235, filed Sep. 11, 2003, Boecker et al.
U.S. Appl. No. 10/659,966, filed Sep. 11, 2003, Chuang et al.
U.S. Appl. No. 10/660,243, filed Sep. 11, 2003, Shafer et al.
U.S Appl. No. 12/247,125 filed Oct. 07, 2008 Chuang et al., Xilinx, 2100 Logic Drive, San Jose, CA 95124.
U.S Appl. No. 12/061,581 filed Apr. 2, 2008, Black, W.C., Xilinx, 2100 Logic Drive, San Jose, CA 95124.
U.S Appl. No. 10/082,442 filed Feb. 22, 2002, Linn J.H. et al., Xilinx, 2100 Logic Drive, San Jose, CA 95124.
U.S Appl. No. 09/858,732, filed May 15, 2001, Schultz, David P., Xilinx, 2100 Logic Drive, San Jose, CA 95124.

* cited by examiner programmable logic device 10 programmable MGT 14 - 28

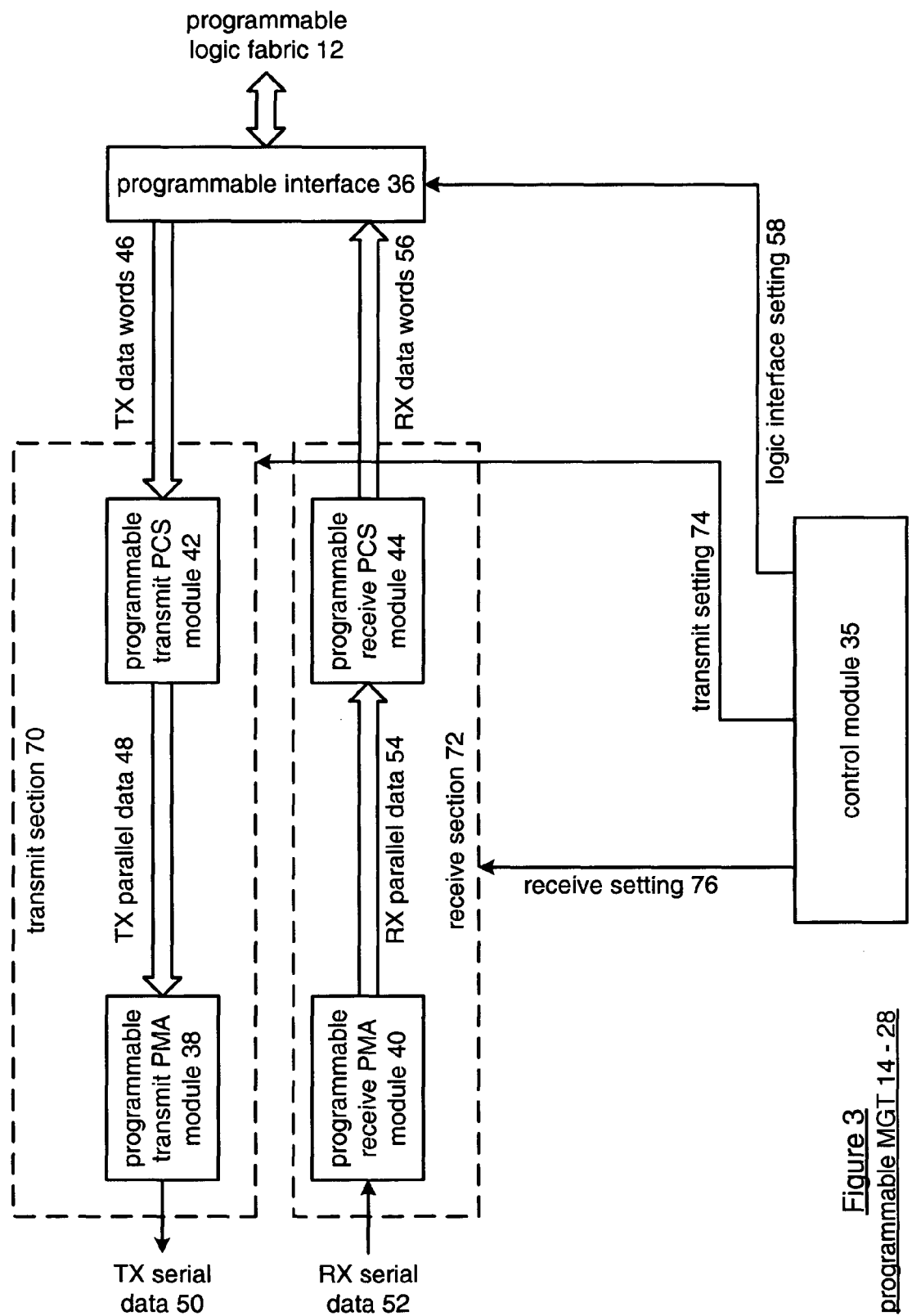

programmable receive PMA module 40 programmable transmit
PMA module 38 transceiver 170 transceiver 184 transceiver 194 transceiver 198 clock recovery circuit 202 clock data recovery block 226

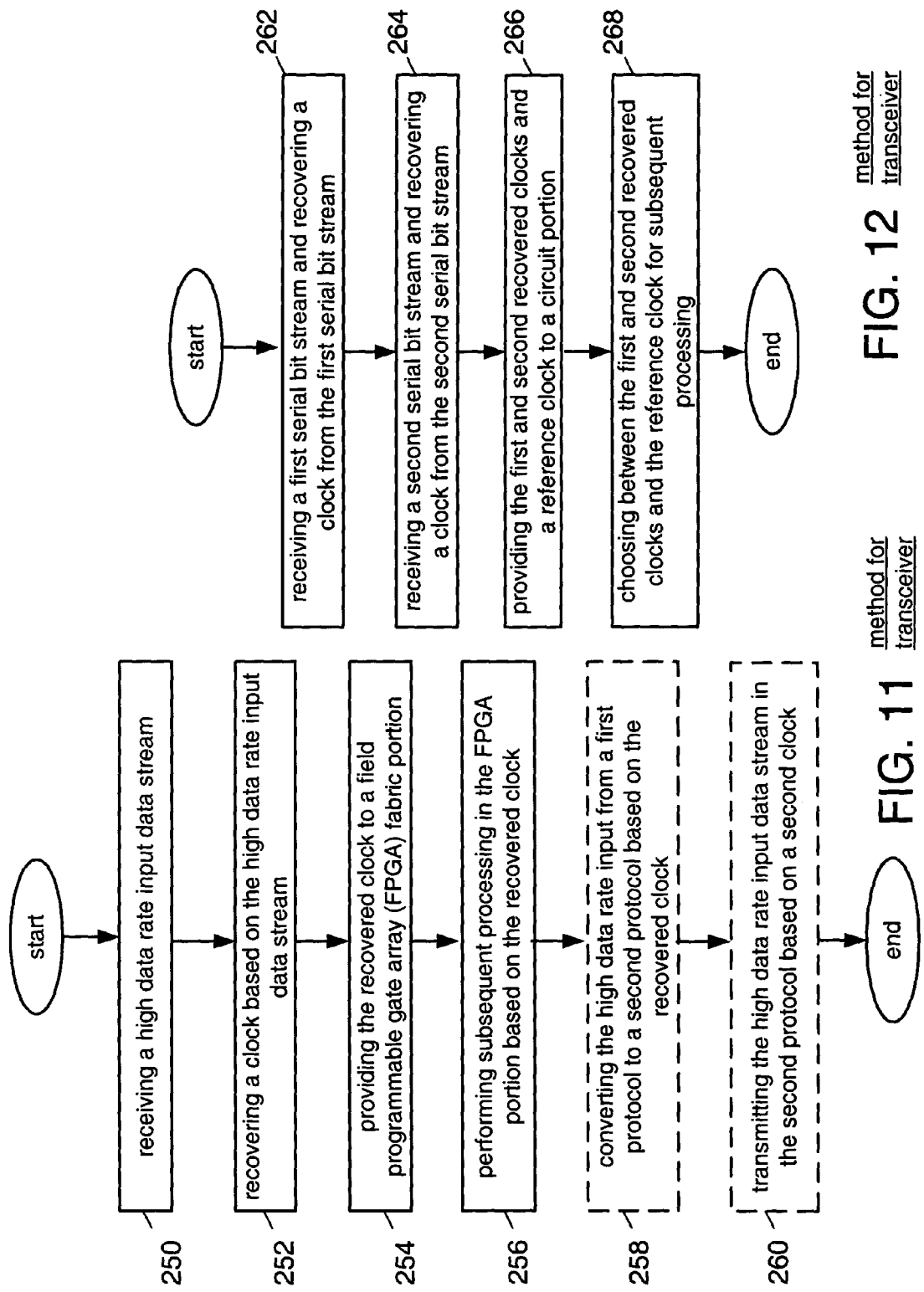

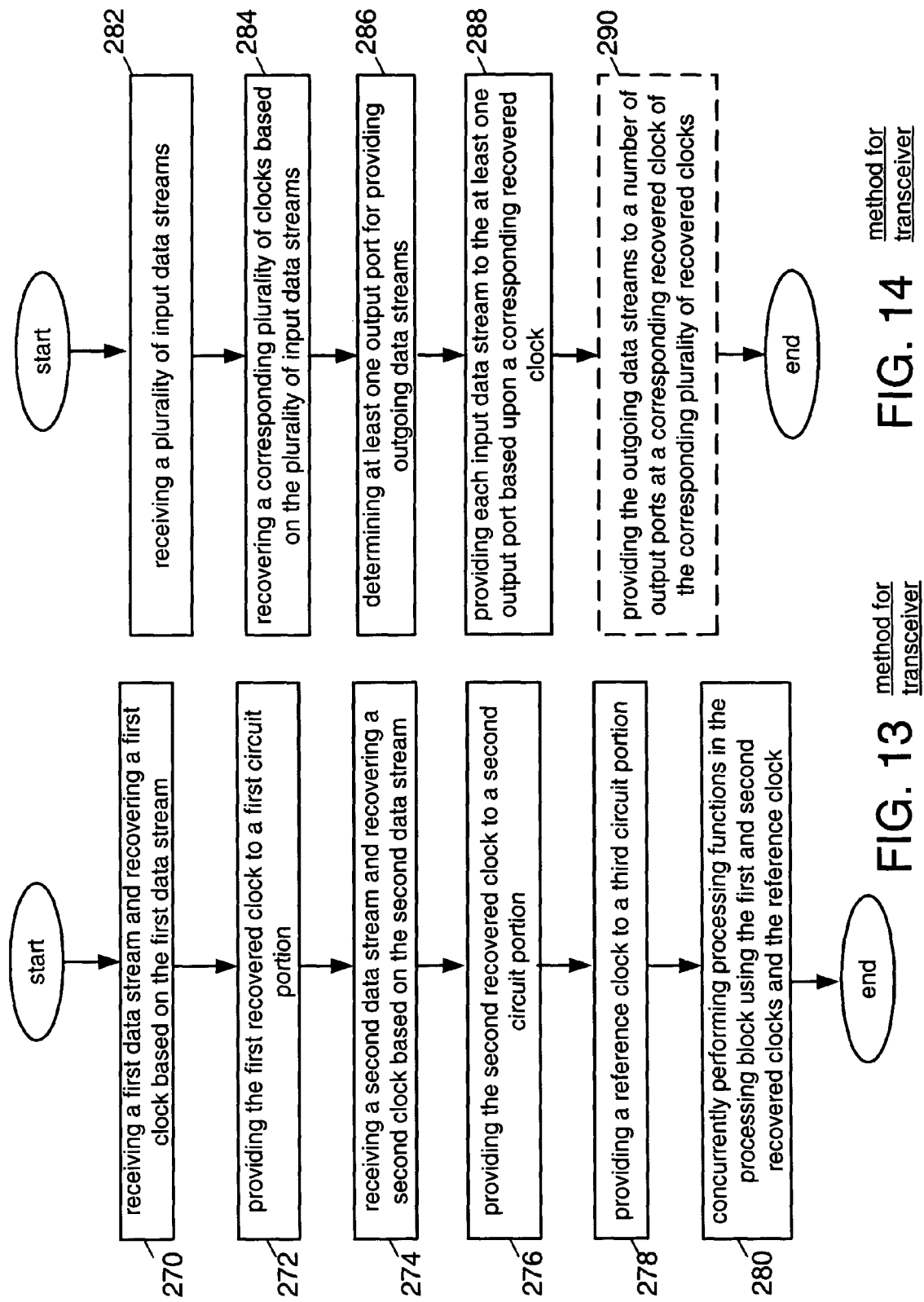

programmable logic device 10 programmable MGT 14 - 28 programmable MGT 14 - 28

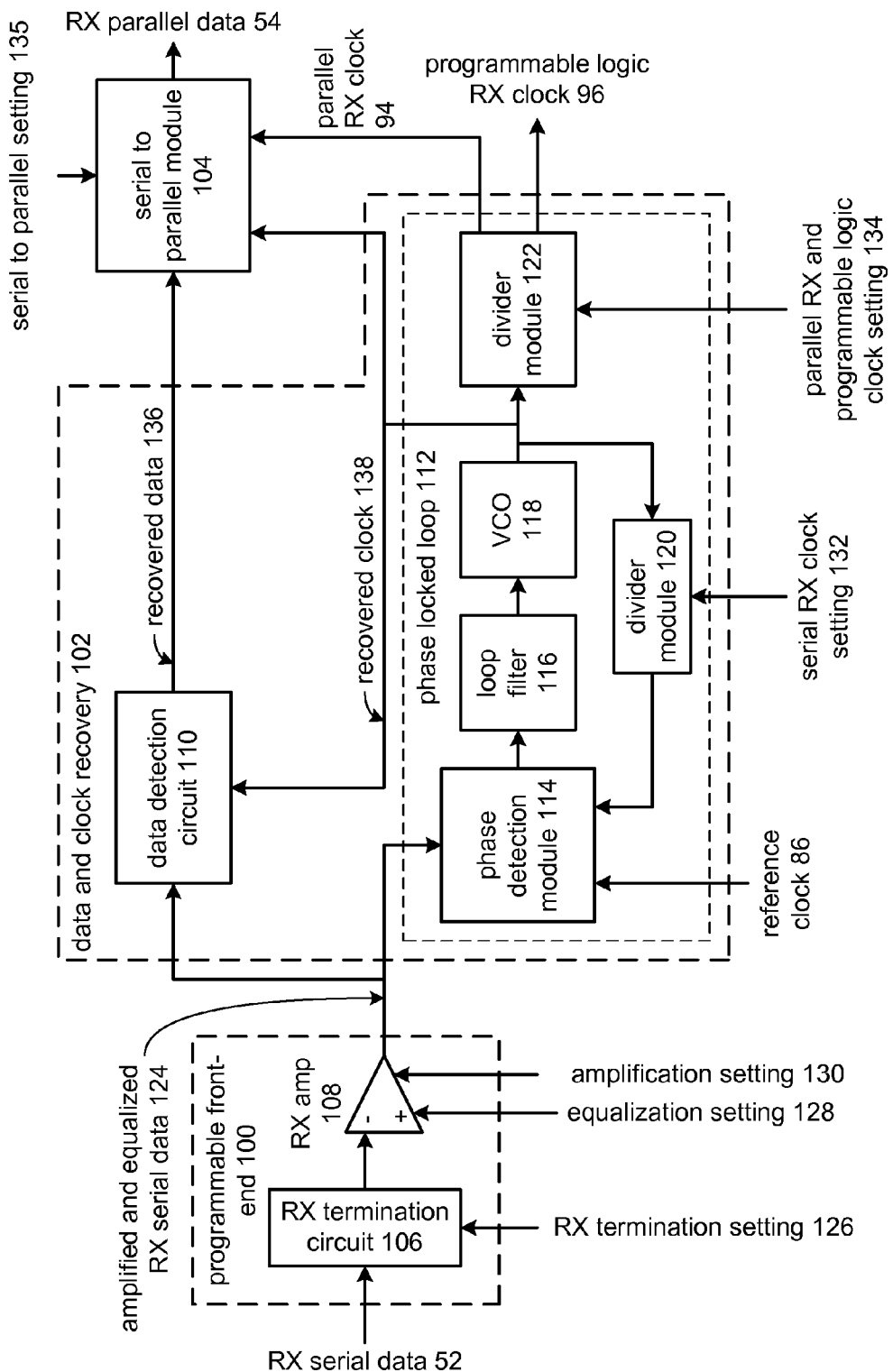
Figure 4A (Prior Art) programmable receive PMA module 40 programmable transmit PMA module 38

MGT/FPGA CLOCK MANAGEMENT SYSTEM

BACKGROUND OF THE INVENTION

1. Technical Field of the Invention

This invention relates generally to communication systems and more particularly to clock recovery circuits used therein.

2. Description of Related Art

Communication systems are known to transport large amounts of data between a plurality of end user devices, which, for example, include telephones, facsimile machines, computers, television sets, cellular telephones, personal digital assistants, etc. As is known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), or Internet. As is further known, communication systems include a plurality of system equipment to facilitate the transporting of data. Such system equipment includes, but is not limited to, routers, switches, bridges, gateways, protocol converters, frame relays, private branch exchanges.

The transportation of data within communication systems is governed by one or more standards that ensure the integrity of data conveyances and fairness of access for data conveyances. For example, there are a variety of Ethernet standards that govern serial transmissions within a communication system at data rates of 10 megabits-per-second, 100 megabits-per-second, 1 gigabit-per-second and beyond. Synchronous Optical NETwork (SONET), for example, currently provides for up to 10 gigabits-per-second. In accordance with such standards, many system components and end user devices of a communication system transport data via serial transmission paths. Internally, however, the system components and end user devices may process data in a parallel manner. As such, each system component and end user device must receive the serial data and convert the serial data into parallel data without loss of information. After processing the data, the parallel data must be converted back to serial data for transmission without loss.

Accurate recovery of information from high-speed serial transmissions typically requires transceiver components that operate at clock speeds equal to or higher than the received serial data rate. Higher clock speeds limit the usefulness of prior art clock recovery circuits that require precise alignment of signals to recover clock and/or data. Higher data rates require greater bandwidth for a the feedback loop of the clock recovery circuits to operate correctly. Some prior art designs are bandwidth limited.

As the demand for data throughput increases, so do the demands on a high-speed serial transceiver. The increased throughput demands are pushing some current integrated circuit manufacturing processes to their operating limits, where integrated circuit processing limits (e.g., device parasitics, trace sizes, propagation delays, device sizes) and integrated circuit (IC) fabrication limits (e.g., IC layout, frequency response of the packaging, frequency response of bonding wires) limit the speed at which the high-speed serial transceiver may operate without excessive jitter performance and/or noise performance.

A further alternative for high-speed serial transceivers is to use an IC technology that inherently provides for greater speeds. For instance, switching from a CMOS process to a silicon germanium or gallium arsenide process would allow integrated circuit transceivers to operate at greater speeds, but at substantially increased manufacturing costs. CMOS is more cost effective and provides easier system integration. Currently, for most commercial-grade applications, including communication systems, such alternate integrated circuit fabrication processes are too cost prohibitive for widespread use.

Modern communication systems, including high data rate communication systems, typically include a plurality of circuit boards that communicate with each other by way of signal traces, bundled data lines, back planes, etc. Accordingly, designers of high data rate communication transceiver devices often have conflicting design goals that relate to the performance of the particular device. For example, there are many different communication protocols specified for data rates that range from 2.48832 gigabits per second for OC48, to 9.95 gigabits per second for OC192. Other known standards define data rates of 2.5 gigabits per second (INFINIBAND) or 3.125 gigabits per second (XAUI). These different data rates affect the allowable rise and fall time of the signal, the peak amplitude of the signal and the response time from an idle state. For example, one protocol may specify a peak voltage range of 200-400 millivolts, while another standard specifies a mutually exclusive voltage range of 500-700 millivolts. Thus, a designer either cannot satisfy these mutually exclusive requirements (and therefore cannot support multiple protocols) or must design a high data rate transceiver device that can adapt according to the protocol being used for the communications.

Along these lines, field programmable gate array (FPGA) circuits are gaining in popularity for providing the required flexibility and adaptable performance described above for those designers that seek to build one device that can operate according to multiple protocols. Thus, while FPGA technology affords a designer an opportunity to develop flexible and configurable hardware circuits, specific designs that achieve the desired operations must still be developed.

One design challenge for serial data processing, especially for high data rate communications, relates to synchronization, and in particular to timing differences between a reference clock and high data rate serial stream. Such differences can lead to buffer overflows/underflows, unnecessary delays and other complications. The problem of synchronization mismatch become more acute in devices that conduct multi-gigabit serial data rates. For such systems, it is important to eliminate these mismatches because of the high volume of data being transported. In these systems especially, but more generally in all serial communication systems, even a mismatch of one percent can lead to buffer overflows/underflows and other problems. This problem of high data rate mismatch is a significant problem for any type of device or system that receives, processes or transmits high data rate serial data. A need exists, therefore, for a device and accompanying method with broad applicability that resolves high data rate mismatch between the data and a given clock used to operate upon or process the high serial rate data.

BRIEF SUMMARY OF THE INVENTION

The present invention provides for a device and a method for processing high data rate serial data that reduces or eliminates mismatch between a reference clock and a high data rate serial data and the associated problems, including buffer overflow or underflow, that result therefrom. Generally, the invention includes circuitry for recovering a clock based on the high data rate input data stream and for providing the recovered clock to a circuit portion, for example, a portion of a field programmable gate array fabric, to enable the circuit portion to use either a reference clock or the recovered clock for subsequent processing. The invention specifically allows for different circuitry portions to utilize different clocks for a corresponding function that is being performed. Applications for the present invention are many but specifically include multi-gigabit transceiver, switching devices, protocol translation devices.

One embodiment of the present invention includes recovering a plurality of clocks from a corresponding plurality of serial data bit streams and using the plurality of recovered clocks to process each of the plurality of serial data bit streams in a corresponding functionality block. Another embodiment receives a high data rate serial data stream in a first protocol and translates the high serial data rate according to a recovered clock for the received high data rate serial data stream to a second protocol. Then, in one embodiment, the high data rate serial data stream in the second protocol is provided for transmission at the recovered clock rate. In an alternate embodiment, if the high data rate serial data stream is generated in the second protocol at a rate that is slightly different than the received data rate, the invention includes determining a corresponding clock and providing the high data rate serial data stream in the second protocol for transmission at a second recovered clock rate. It may be seen, therefore, that the invention includes circuitry and method for recovering and using a clock for a particular application to reduce timing mismatches. Further, the invention includes a device and method for recovering a plurality of clocks and performing a plurality of functions based on the plurality of recovered clocks concurrently.

BRIEF DESCRIPTION OF THE DRAWINGS

FIG. 11 illustrates a method for processing high data rate serial data according to a first embodiment of the invention;

FIG. 12 illustrates a method of processing high data rate serial data according to a second embodiment of the invention;

FIG. 13 illustrates a method of clock management according to a third embodiment of the invention; and FIG. 14 illustrates a method of clock management according to a fourth embodiment of the invention.

DETAILED DESCRIPTION OF THE INVENTION

Figure 1:
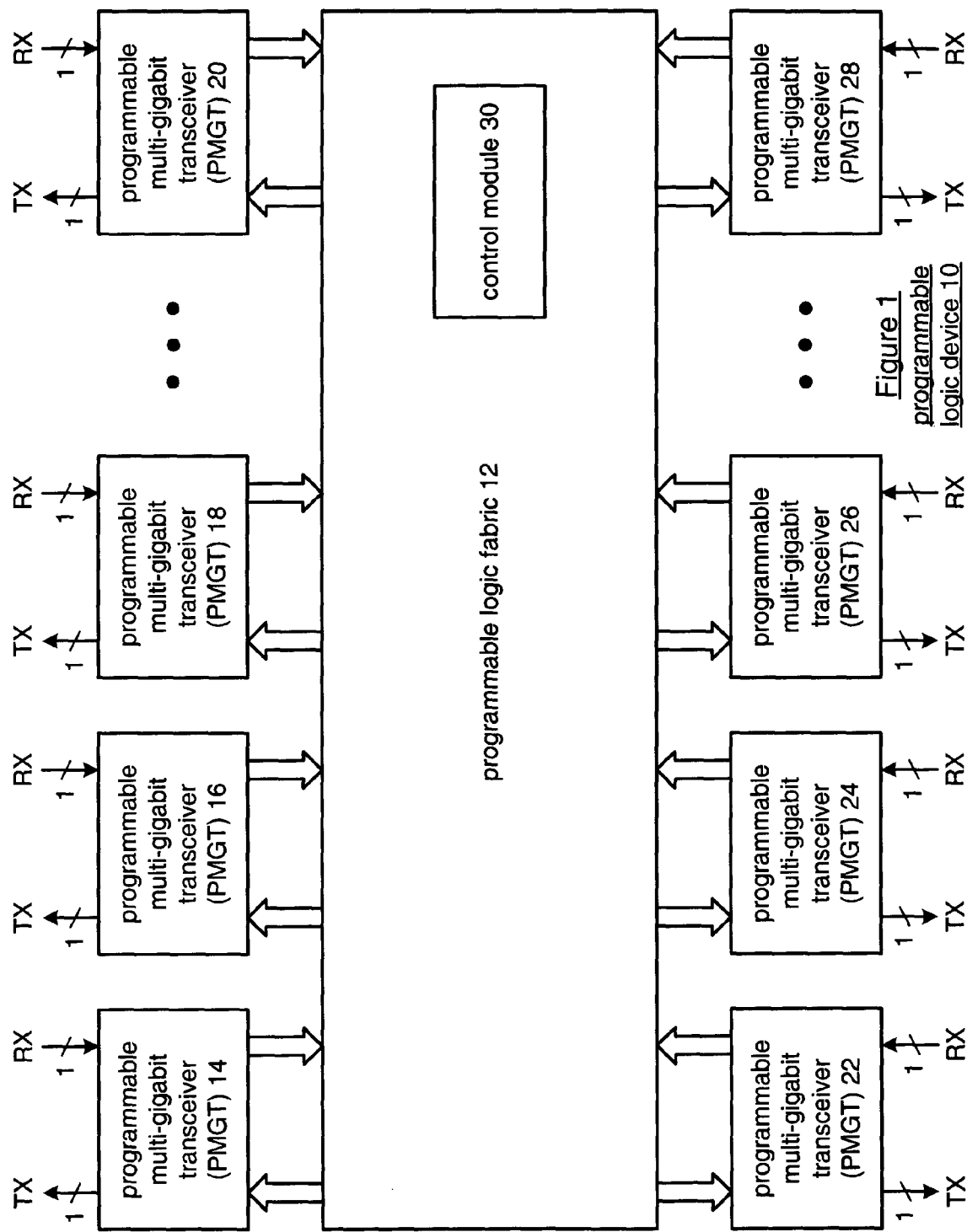
FIG. 1 is a schematic block diagram of a programmable logic device that includes programmable logic fabric, a plurality of programmable multi-gigabit transceivers (PMGT) and a control module.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be a programmable logic array device, a programmable array logic device, an erasable programmable logic device, and/or a field programmable gate array (FPGA). When the programmable logic device 10 is an FPGA, the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on receive data and performs a parallel-to-serial conversion on transmit data. The parallel data may be, for instance, 8-bits, 16-bits, 32-bits, or 64-bits, wide.

Typically, the serial data will be a 1-bit stream of data that may be a binary level signal, multi-level signal, etc. Further, two or more programmable multi-gigabit transceivers may be bonded together to provide greater transmitting speeds. For example, if programmable multi-gigabit transceivers 14, 16 and 18 are transceiving data at 3.125 gigabits-per-second, the transceivers 14-18 may be bonded together such that the effective serial rate is approximately 3 times 3.125 gigabits-per-second.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed, for example, from 1 gigabit-per-second to tens of gigabits-per-second. The size of the parallel data in the transmit and receive sections, or paths, is also programmable and may vary, for instance, from 8-bits, 16-bits, 32-bits, or 64-bits.

Figure 2:
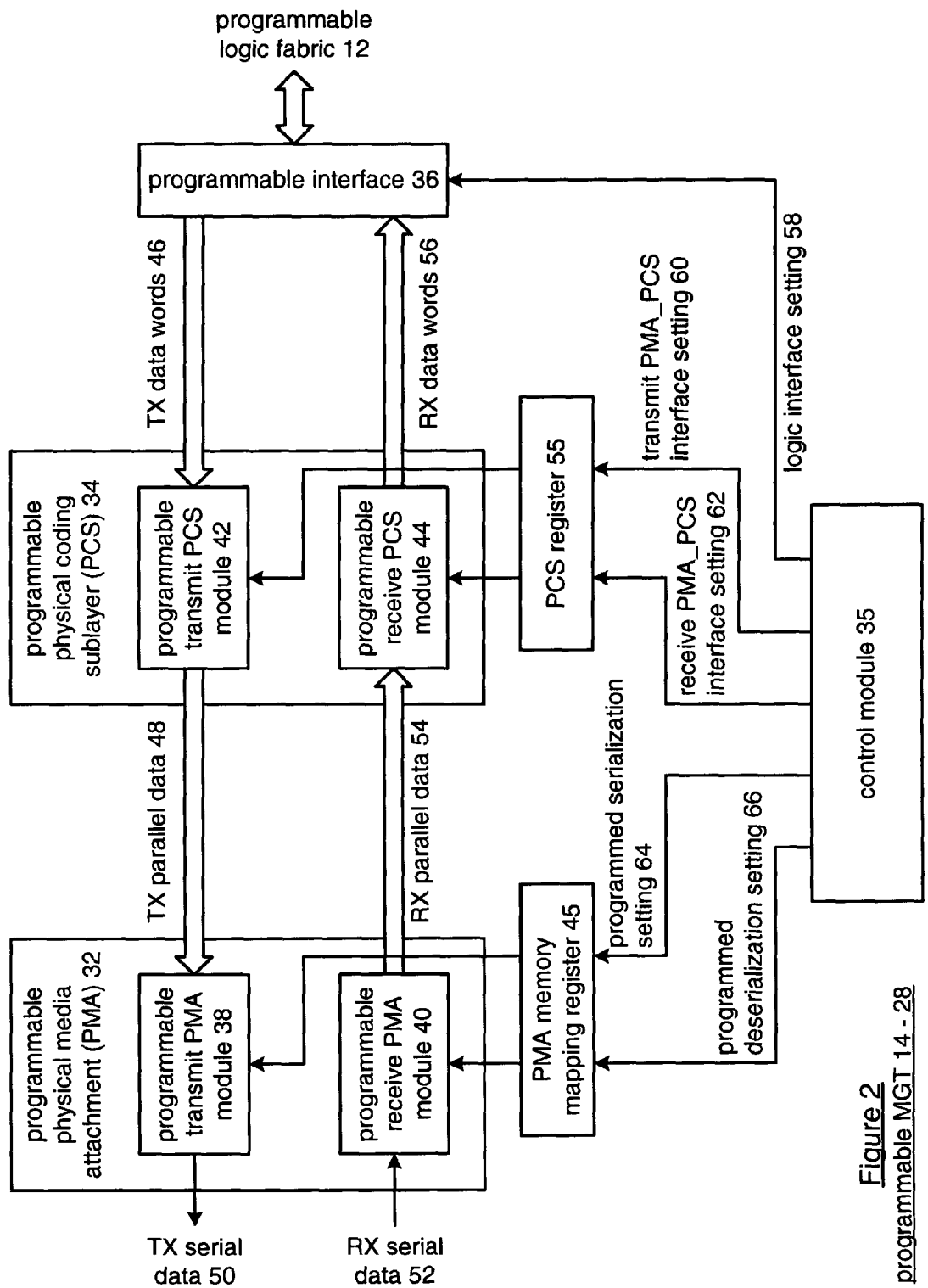
FIG. 2 is a schematic block diagram of one embodiment of a representative one of the programmable multi-gigabit transceivers.

FIG. 2 is a schematic block diagram of one embodiment of a representative one of the programmable multi-gigabit transceivers 14-28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers or included partially or entirely within the control module 30.

In either embodiment of the control module 35, the programmable logic device control module 30 determines the corresponding overall desired operating conditions for the programmable logic device 10 and provides the corresponding operating parameters for a given programmable multi-gigabit transceiver to its control module 35, which generates the settings 58-66.

The programmable physical media attachment (PMA) module 32 includes a programmable transmit PMA module 38 and a programmable receive PMA module 40. The programmable transmit PMA module 38, which will be described in greater detail with reference to FIG. 4B, is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40, is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the serialization setting 64 and the deserialization setting 66.

The programmable physical coding sub-layer (PCS) module 34 includes a programmable transmit PCS module 42 and a programmable receive PCS module 44. The programmable transmit PCS module 42, receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes) and the corresponding transmission rate of the transmit parallel data 48. The programmable receive PCS module 44, converts the receive parallel data 54 into receive data words 56 in accordance with the receive PMA_PCS interface setting 62. The receive PMA_PCS interface setting 62 indicates the rate at which the receive parallel data 54 will be received, the width of the receive parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the receive data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard such that the receive path, i.e., the path through programmable receive PMA module 40 and the programmable receive PCS module 44 may be programmed in accordance with one standard while the transmit path, i.e., path through the programmable transmit PCS module 42 and the programmable transmit PMA module 38 may be programmed in accordance with the same or another standard.

Figure 3:
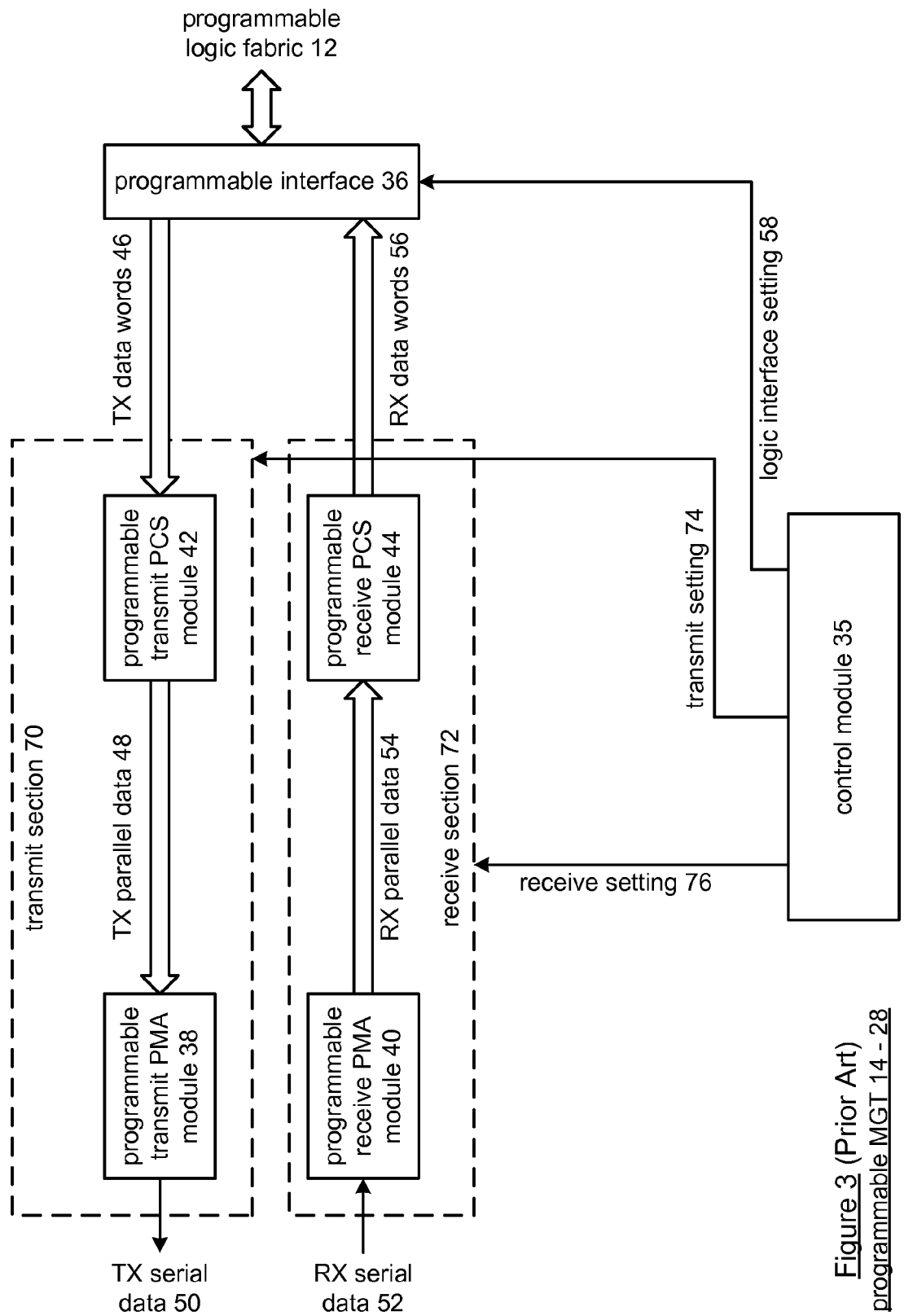
FIG. 3 illustrates an alternate schematic block diagram of a representative one of the programmable multi-gigabit transceivers.
Figure 4B:
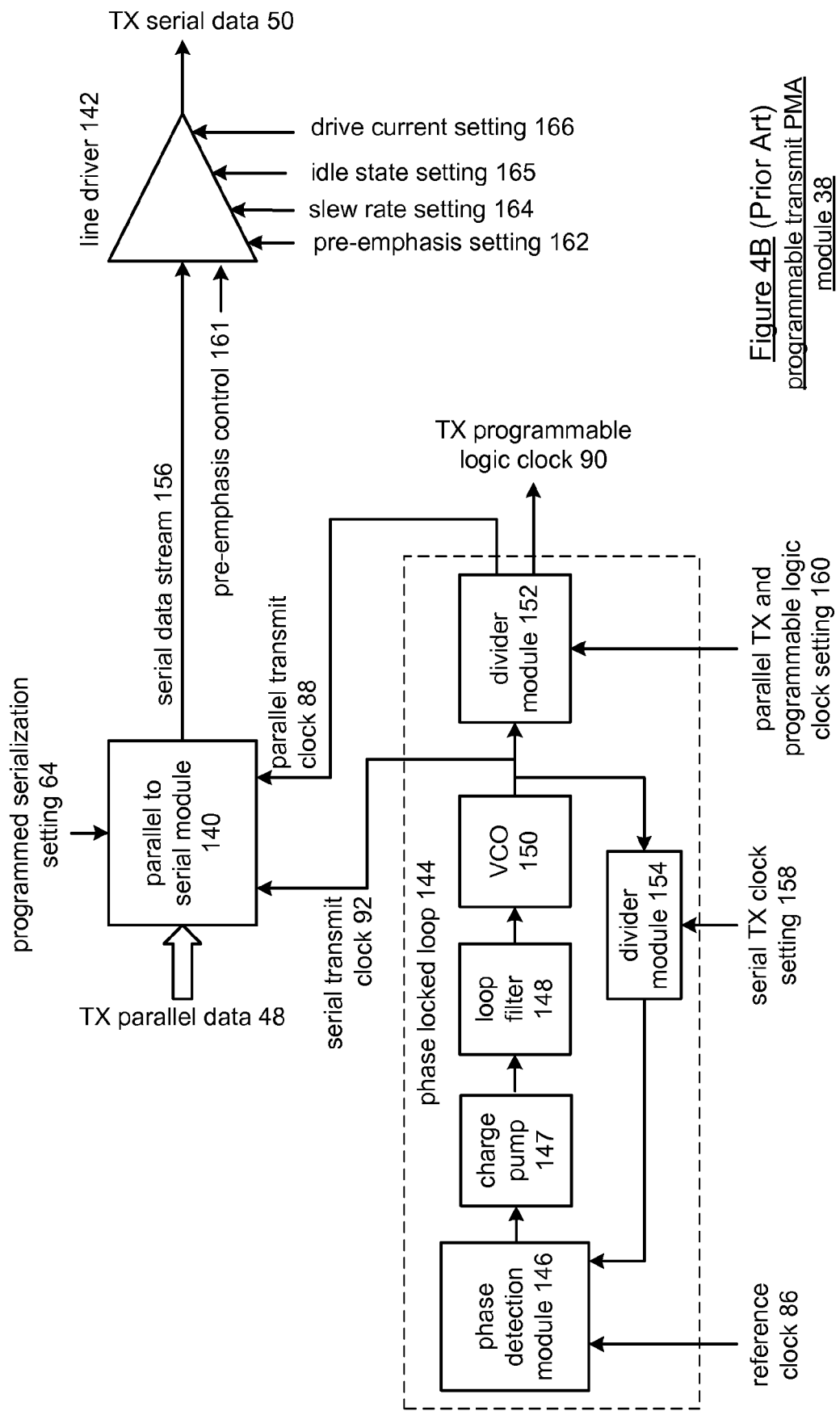

FIG. 3 illustrates an alternate schematic block diagram of a representative one of the programmable multi-gigabit transceivers 14-28. In this embodiment, the programmable multi-gigabit transceiver 14-28 includes a transmit section 70, a receive section 72, the control module 35 and the programmable interface 36. The transmit section 70 includes the programmable transmit PMA module 38 and the programmable transmit PCS module 42. The receive section 72 includes the programmable receive PMA module 40 and the programmable receive PCS module 44.

In this embodiment, the control module 35 separately programs the transmit section and the receive section via transmit setting 74 and receive setting 76, respectively. The control module 35 also programs the programmable interface 36 via the logic interface setting 58. Accordingly, the control module 35 may program the receive section 72 to function in accordance with one standard while programming the transmit section 70 in accordance with the same or another standard. Further, the logic interface setting 58 may indicate that the transmit data words 46 are received from the programmable logic fabric 12 at a different rate than the received data words 56 are provided to the programmable logic fabric 12. As one of average skill in the art will appreciate, the programmable interface 36 may include a transmit buffer and a receive buffer, and/or an elastic store buffer to facilitate the providing and receiving of the data words 46 and 56 to-and from the programmable logic fabric 12.

Figure 4A:
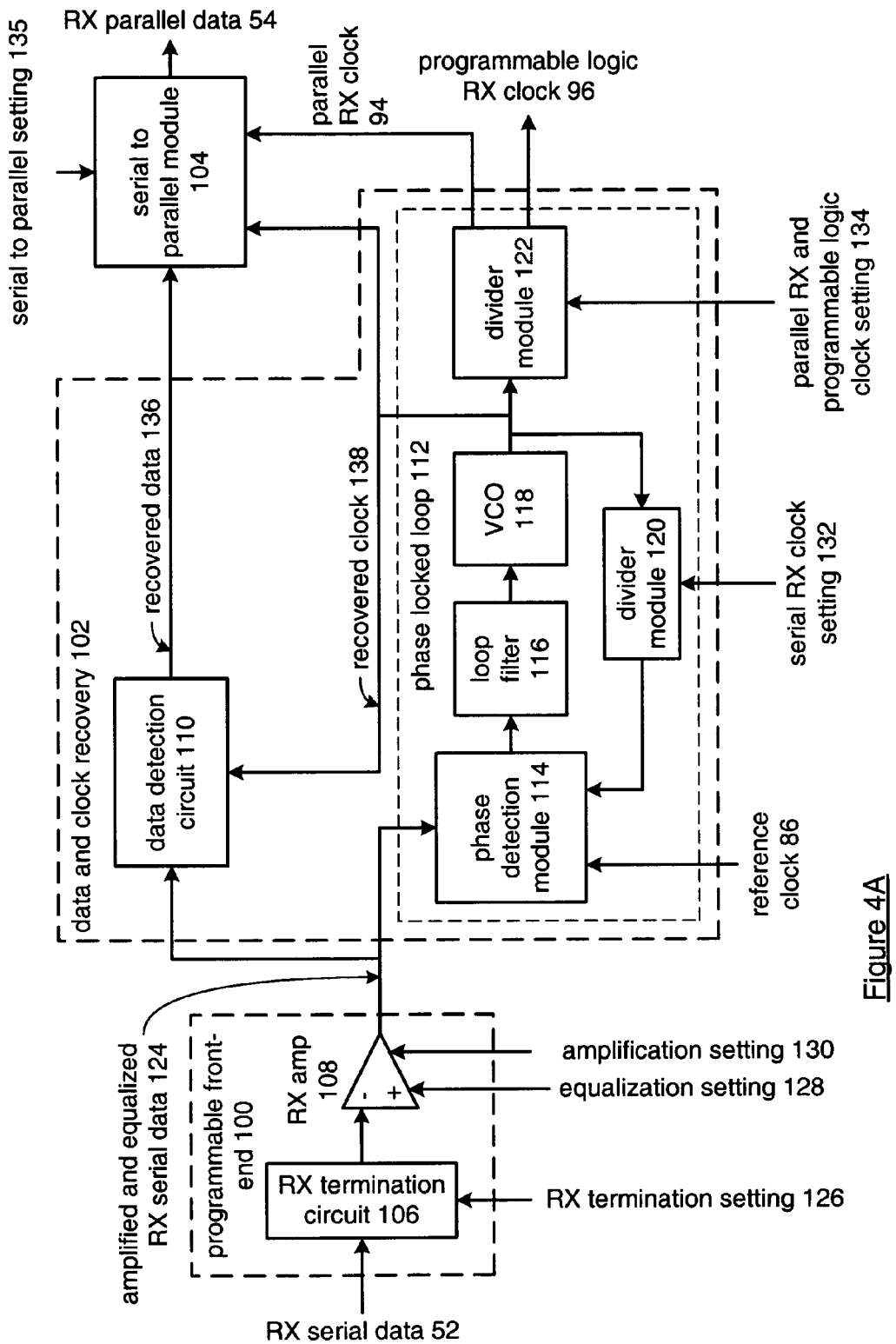
FIG. 4A illustrates a schematic block diagram of the programmable receive PMA module that includes a programmable front-end, a data and clock recovery module, and a serial-to-parallel module.
Figure 4B:
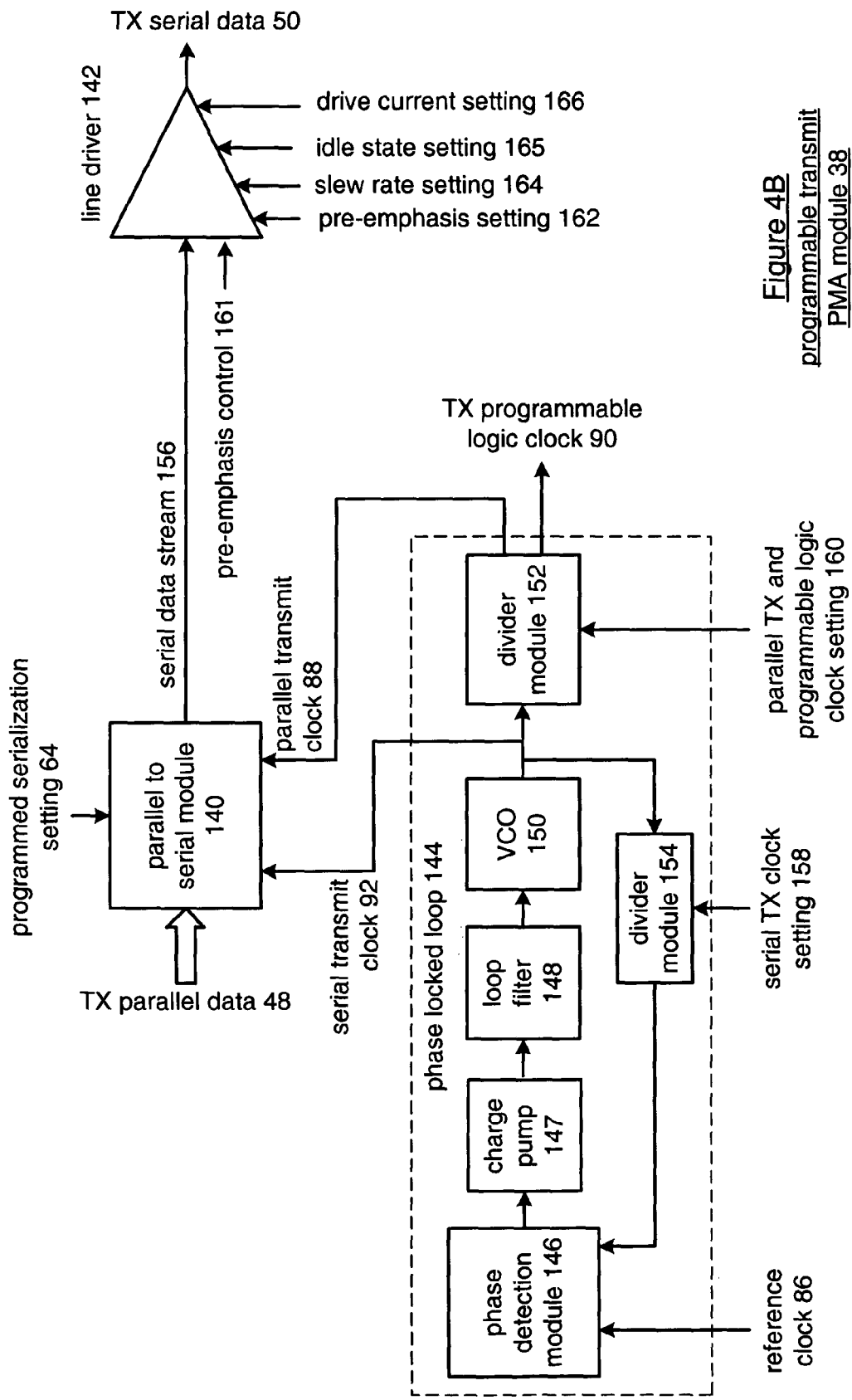
FIG. 4B illustrates a schematic block diagram of a programmable transmit PMA module that includes a phase locked loop, a parallel-to-serial module, and line driver.

FIG. 4A illustrates a schematic block diagram of the programmable receive PMA module 40 that includes a programmable front-end 100, a data and clock recovery module 102, and a serial-to-parallel module 104. The programmable front-end 100 includes a receiver termination circuit 106 and a receiver amplifier 108. The data and clock recovery module 102 includes a data detection circuit 110 and a phase locked loop 112. The phase locked loop 112 includes a phase detection module 114, a loop filter 116, a voltage controlled oscillator 118, a $1^{st}$ divider module 120, and a $2^{nd}$ divider module 122.

The programmable front-end 100 is operably coupled to receive the receive serial data 52 and produce amplified and equalized receive serial data 124 therefrom. To achieve this, the receiver termination circuit 106 is programmed in accordance with a receive termination setting 126 to provide the appropriate termination for the transmission line between the programmable receiver PMA module 40 and the source that originally transmitted the receive serial data 52. The receive termination setting 126 may indicate whether the receive serial data 52 is a single-ended signal, a differential signal, may indicate the impedance of the transmission line, and may indicate the biasing of the receiver termination circuit 106. For a more detailed discussion of the receiver termination circuit 106 refer to co-pending patent application entitled "RECEIVER TERMINATION NETWORK AND APPLICATION THEREOF" by Charles W. Boecker, William C.

Black, and Eric D. Groen, having the same filing date as the present application, which is hereby incorporated by reference in its entirety.

The receiver termination circuit 106 further biases the receive serial data 52 and provides the bias adjusted signal to the receiver amplifier 108. The equalization and gain settings of the receiver amplifier 108 may be adjusted in accordance with equalization setting 128 and amplification setting 130, respectively. Further description of the receiver amplifier 108 may be found in co-pending patent application entitled "ANALOG FRONT-END HAVING BUILT-IN EQUALIZATION AND APPLICATIONS THEREOF" by William C. Black, Charles W. Boecker, and Eric D. Groen, having a filing date the same as the present patent application, which is hereby incorporated by reference in its entirety. Note that the receiver termination setting 126, the equalization setting 128, and the amplification setting 130 are part of the programmed deserialization setting 66 provided by the control module 35.

The data and clock recovery circuit 102 receives the amplified and equalized receive serial data 124 via the phase detection module 114 of phase locked loop 112 and via the data detection circuit 110. The phase detection module 114 has been initialized prior to receiving the amplified and equalized receive serial data 124 by comparing the phase and/or frequency of a reference clock 86 with a feedback reference clock produced by divider module 120. Based on this phase and/or frequency difference, the phase detection module 114 produces a corresponding current that is provided to loop filter 116. The loop filter 116 converts the current into a control voltage that adjusts the output frequency of the voltage controlled oscillator 118. The divider module 120, based on a serial receive clock setting 132, divides the output oscillation produced by the VCO 118 to produce the feedback signal. Once the amplified and equalized receive serial data 124 is received, the phase detection module 114 compares the phase of the amplified and equalized receive serial data 124 with the phase of the feedback signal, and produces a current signal based on the phase difference.

The phase detection module 114 provides the current signal to the loop filter 116, which converts it into a control voltage that controls the output frequency of the voltage controlled oscillator 118. At this point, the output of the voltage controlled oscillator 118 corresponds to a recovered clock 138 in steady state operation. The recovered clock 138 is provided to the divider module 122, the data detection circuit 110 and to the serial-to-parallel module 104. The data detection circuit 110 utilizes the recovered clock 138 to recover recovered data 136 from the amplified and equalized receive serial data 124. The divider module 122 divides the recovered clock 138, in accordance with a parallel receive and programmable logic clock setting 134, to produce the parallel receive clock 94 and a programmable logic receive clock 96. Note that the serial receive clock setting 132 and the parallel receive and programmable logic clock setting 134 are part of the programmed deserialization setting 66 provided to the programmable receive PMA module 40 by the control module 35.

The serial-to-parallel module 104, which may include an elastic store buffer, receives the recovered data 136 at a serial rate in accordance with the recovered clock 138. Based on a serial-to-parallel setting 135 and the parallel receive clock 194, the serial-to-parallel module 104 outputs the receive parallel data 54. The serial-to-parallel setting 135, which may be part of the programmed deserialization setting 66, indicates the data rate and data width of the receive parallel data 54.

FIG. 4B illustrates a schematic block diagram of a programmable transmit PMA module 38 that includes a phase locked loop 144, a parallel-to-serial module 140, and line driver 142. The phase locked loop 144 includes a phase detection module 146, a charge pump 147, a loop filter 148, a voltage controlled oscillator 150, a divider module 154, and a divider module 152.

The phase detection module 146 compares the phase and/or frequency of the reference clock 86 with the phase and/or frequency of an output produced by divider module 154. The phase detection module 146 generates control signals to charge pump 147 which, in turn, produces a current signal to represent the phase and/or frequency difference between the reference clock 86 and the feedback oscillation. The loop filter 148 converts the current signal into a control voltage that regulates the output oscillation produced by the voltage controlled oscillator 150. Divider module 154, based on a serial transmit clock setting 158, divides the output oscillation of the VCO 150, which corresponds to the serial transmit clock 92, to produce the feedback oscillation. Note that the serial transmit clock setting 158 may be part of the programmed serialization setting 64 provided to the programmable transmit PMA module 38 by the control module 35.

Divider module 152 receives the serial transmit clock 92 and, based on a parallel transmit and programmable logic clock setting 160, produces the parallel transmit clock 88 and the transmit programmable logic clock 90. The parallel transmit and programmable logic clock setting 160 may be part of the programmed serialization setting 64.

The parallel-to-serial module 140 receives the transmit parallel data 48 and produces therefrom a serial data stream 156. To facilitate the parallel-to-serial conversion, the parallel-to-serial module 140, which may include an elastic store buffer, receives a parallel-to-serial setting to indicate the width of the transmit parallel data 48 and the rate of the transmit parallel data, which corresponds to the parallel transmit clock 88. Based on the parallel-to-serial setting, the serial transmit clock 92 and the parallel transmit clock 88, the parallel-to-serial module 140 produces the serial data stream 156 from the transmit parallel data 48.

The line driver 142 increases the power of the signals forming serial data stream 156 to produce the transmit serial data 50. The line driver 142, which is described in greater detail in co-pending patent applications related applications listed above and having the same filing date as the present application, may be programmed to adjust its pre-emphasis settings, slew rate settings, and drive settings via a pre-emphasis control signal 161, a pre-emphasis setting signal 162, a slew rate setting signal 164, an idle state setting 165 and a drive current setting 166. The pre-emphasis control signal 161, pre-emphasis setting signal 162, the slew rate setting signal 164, the idle state setting 165 and the drive current setting 166 may be part of the programmed serialization setting 64. As one of average skill in the art will appreciate, while the diagram of FIG. 4B is shown as a single-ended system, the entire system may use differential signaling and/or a combination of differential and single-ended signaling.

Figure 5:
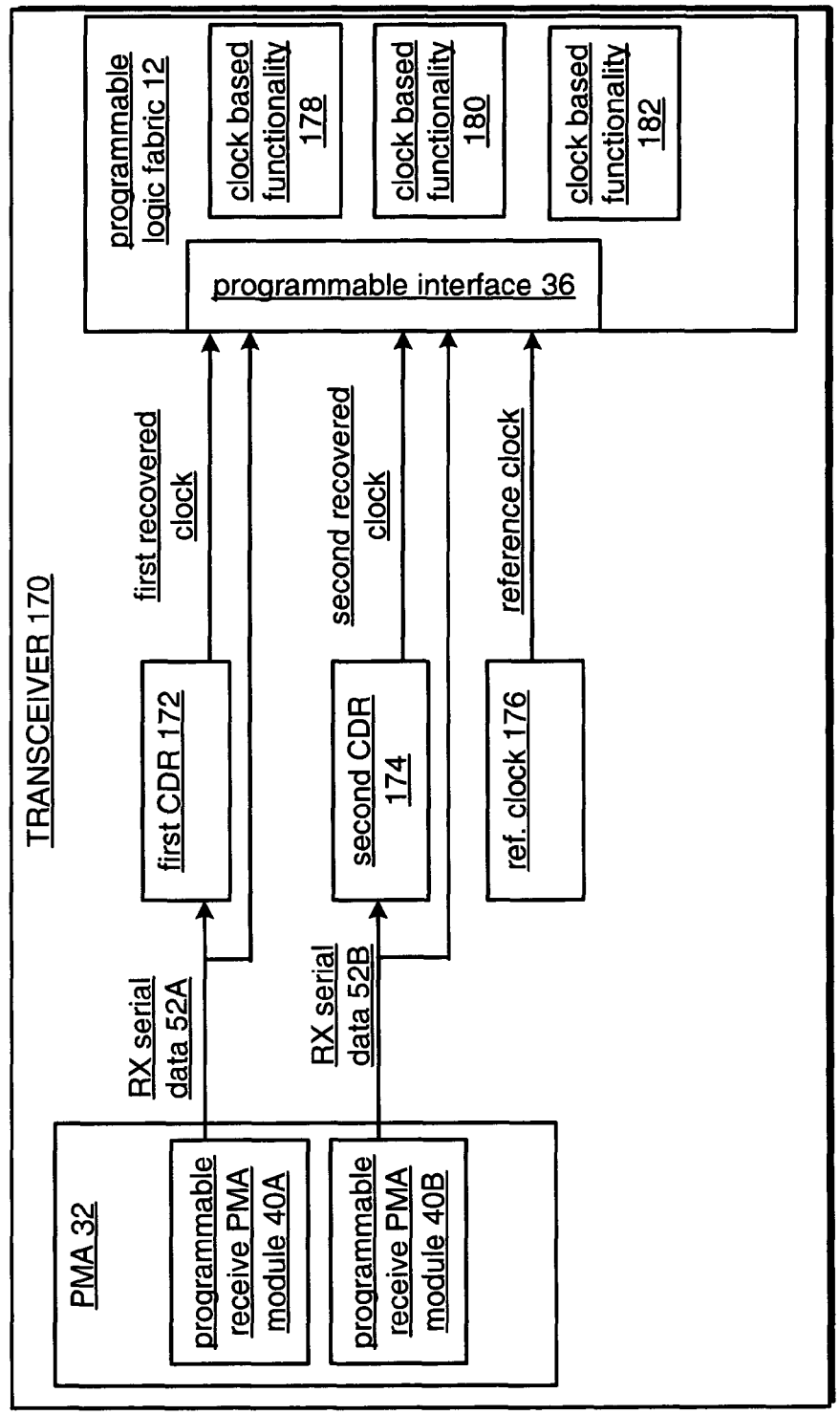
FIG. 5 is a functional block diagram of a transceiver that selects one of a plurality of clocks according to one embodiment of the invention.

FIG. 5 is a functional block diagram of a transceiver 170 that selects one of a plurality of clocks according to one embodiment of the invention. A transceiver 170 may be formed as an ASIC, an FPGA, or a processor based device, or any combination thereof for performing a specified function. In the examples of FIGS. 5-8, the transceiver comprises a combination of ASIC and FPGA (e.g., fixed and programmable) circuitry. In FIG. 5, transceiver 170, which is for processing high data rate serial data, includes a first clock data recovery circuitry 172 for receiving first serial data 52A from a receiver block such as a programmable receive PMA module 40A and for providing a first recovered clock from the first serial data 52A. The transceiver 170 further includes a second clock data recovery circuitry 174 for receiving second serial data 52B from a receiver block such as a programmable receive PMA module 40B and for providing a second recovered clock from the second serial data 52B. Transceiver 170 further includes a reference clock module 176 for providing a reference clock signal. The reference clock and the first and second recovered clocks are all provided to programmable interface 36 of programmable logic fabric 12. Programmable logic fabric 12 receives each recovered clock and reference clock produced to it and routes the clock to specified functionalities within the logic fabric as specified by the programmable logic. Additionally, each serial data stream, here RX serial data streams 52A and 52B, are also provided to programmable interface 36 of programmable logic fabric 12.

The programmable logic fabric 12 includes a plurality of clock based functionalities illustrated herein as clock based functionalities 178, 180 and 182. Each of the first and second recovered clocks and the reference clock is provided to a circuit portion of the transceiver wherein the circuit portion chooses among the first and second recovered clocks and the reference clock for subsequent processing by at least one clock based functionality (here, by the three clock based functionalities 178, 180 and 182). For example, in the embodiment of invention shown in FIG. 5, the first and second recovered clocks and the reference clock are provided to the programmable interface 36 of the programmable logic fabric 12. Each clock based functionality selects one of the clocks provided to the programmable interface 36 (e.g., one of the first and second recovered clocks and the reference clock) and, based on the selected clock, performs subsequent specified functions.

In the described embodiment of FIG. 5, transceiver 170 includes at least three clock based functionalities 178, 180 and 182, respectively. Each functionality 178, 180 and 182 selects a clock for its functionality and thus may operate according to different clocks in relation to each other. In the described embodiment, each functionality 178, 180 and 182 selects a specified recovered clock according to programming or internal logic. While each clock based functionality 178, 180 and 182 is shown within programmable logic fabric 12, they may readily be formed external to such fabric 12 and may, for example, be formed out of and as a part of application specific integrated circuitry or other logic circuitry. Each functionality 178, 180 and 182 includes circuitry for performing a specified task, which may include tasks relating to high rate serial data processing.

More generally, the invention shown in FIG. 5 illustrates the generation of a plurality of clocks and selectively performing specified functions based on any one or more of the plurality of clocks. Thus, the invention includes performing functions that are synchronized in time with the data for which the function is being performed. By separating functionality from a system clock or reference clock, and by synchronizing the functionality with a clock within a serial data transmission, a need for large buffers and the possibility of buffer overflows/underflows due to mismatches in the reference clock and the data stream rate is avoided or at least reduced.

Figure 6:
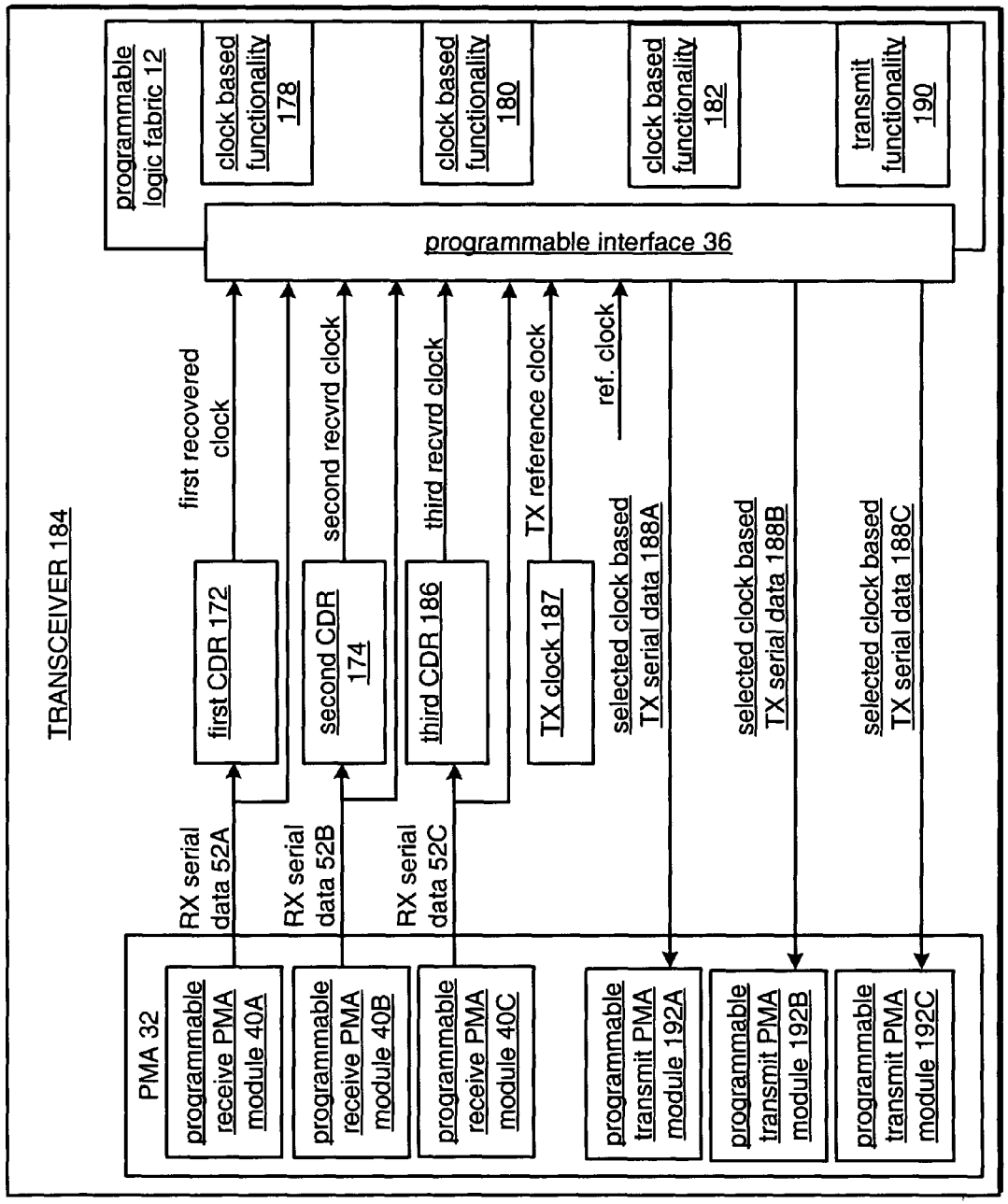
FIG. 6 is a functional block diagram of a transceiver that includes a plurality of clock based functionalities that each selects one of a plurality of clocks according to one embodiment of the invention.

FIG. 6 is a functional block diagram of a transceiver 184 that includes a plurality of clock based functionalities that each selects one of a plurality of recovered or reference clocks according to one embodiment of the invention. Transceiver 184, in comparison to transceiver 170, includes third clock data recovery circuitry 186 for receiving RX serial data 52C from a third programmable receive PMA module 40C and for providing a third recovered clock to programmable interface 36 of programmable logic fabric 12. Additionally, a transmitter clock 187 produces a transmit reference clock signal to programmable interface 36. Generally, a transmit reference clock is merely a clock, perhaps a recovered clock, for a serial data stream that is to be provided by the transceiver, here, transceiver 184. For example, if a serial data stream is being provided for transmission at a specified rate, the transmit reference clock reflects a clock rate of the transmit data as it is being provided, and may be provided to a functionality for processing at the specified transmit clock rate.

Programmable logic fabric 12 of transceiver 184 provides each received input serial data stream of the plurality of input serial data streams to a specified outgoing transmit block based upon a clock that is recovered from the corresponding input serial data streams. More specifically, in the example shown, the transmit blocks include programmable transmit PMA modules 192A, 192B and 192C. Alternatively, each of these transmit blocks may readily be a transmitter port, for example. In the described example, any one of the clock based functionalities 178, 180 and 182 processes any one of the received RX serial data streams 52A, 52B and 52C based upon a corresponding recovered clock according to specified logic or programming. In the example herein, transmit functionality 190 provides the TX serial data 188A, 188B and 188C to the corresponding programmable transmit PMA module 192A, 192B and 192C according to the corresponding recovered clocks (with which the functionality processed the data).

Generally, FIG. 6 illustrates that a plurality of functionalities, including one or more transmit functionalities, may process a serial data stream according either to a recovered clock of the data, a reference clock, or a transmitter clock as described before. Further, FIG. 6 illustrates that the different functionalities may operate according to the different clocks in a concurrent manner.

FIG. 6 further illustrates use of an embodiment of the present invention in a switching application. As may be seen, three serial data streams are received and are provided to a selected output port. Thus, the clock based functionalities may be as simple as routing the received serial data streams to selected output ports or transmit PMA modules. In general, a clock is recovered from each of the input data streams and is used for routing and producing output data streams. By routing and transmitting each according to a corresponding recovered clock rate, significant timing problems, including buffer overflow/underflow problems, are reduced or eliminated. It should be understood that FIG. 6 merely shows three input and three output serial data streams but that the invention is not so limited and includes any number of each. For example, first CDR 172 provides a recovered clock for RX serial data 52A to programmable logic fabric 12. PMA 32 provides RX serial data 52A to first CDR 172 as well as to programmable logic fabric 12 by way of programmable interface 36. Thereafter, a specified functionality, such as functionality 178 provides selected clock based serial data 188A. The selected clock may be the first recovered clock provided by first CDR 172 or any other selected clock including the reference clock.

Figure 7:
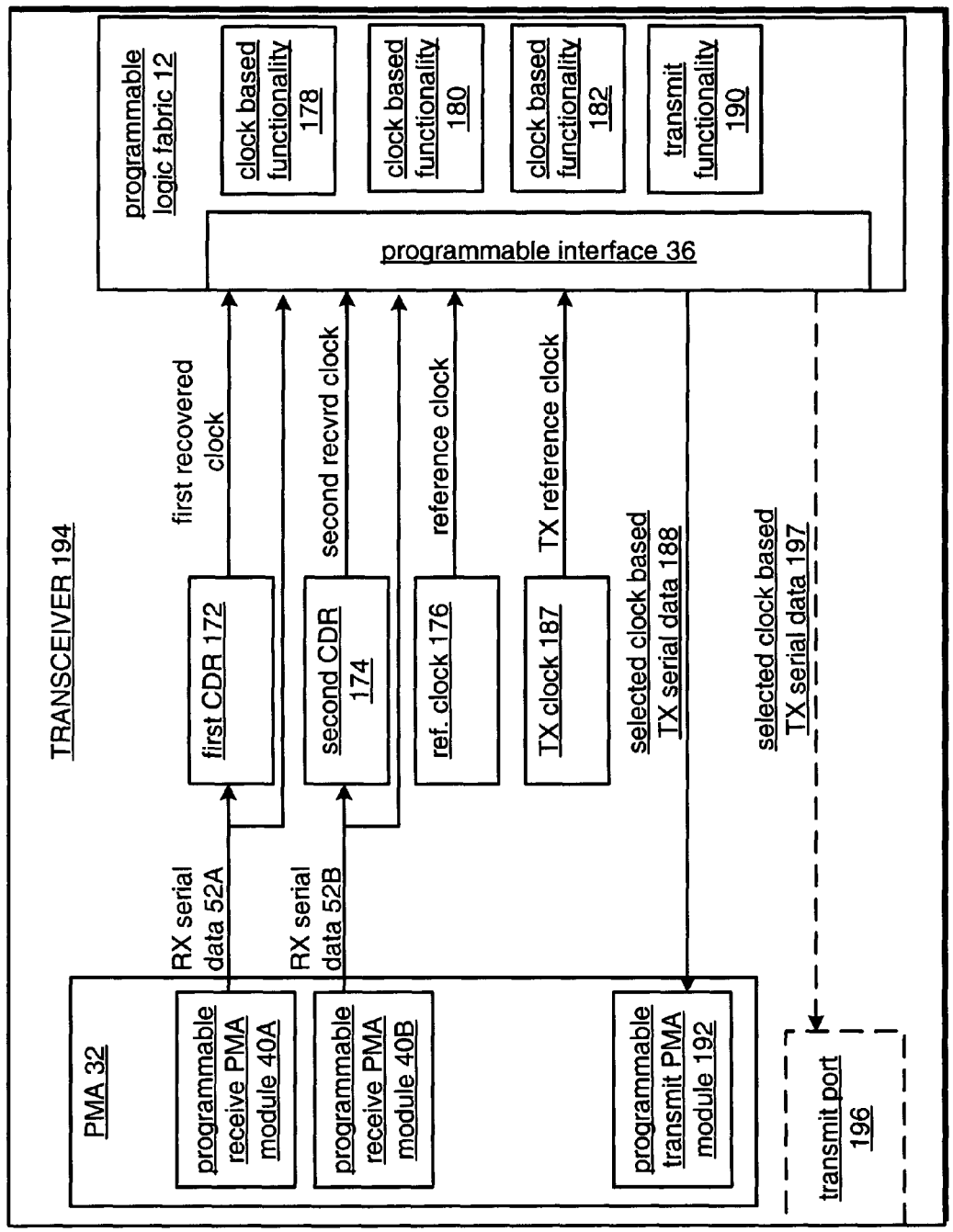
FIG. 7 is a functional block diagram of a transceiver that includes a plurality of clock based functionalities that each selects one of a plurality of clocks for providing outgoing serial data an a plurality of data ports or modules according to one aspect of an embodiment of the present invention.

FIG. 7 is a functional block diagram of a transceiver 194 that includes a plurality of clock based functionalities that each selects one of a plurality of clocks for producing outgoing serial data on a plurality of data ports or modules according to one aspect of an embodiment of the present invention. In contrast to transceiver 184 of FIG. 6 and to transceiver 170 of FIG. 5, transceiver 194 of FIG. 7 further includes a transmit port 196 at which a serial data stream may be provided. In operation, transmit functionality 190 provides selected clock based TX serial data 188 to transmit port 192 and selected clock based TX serial data 197 to programmable transmit PMA module 196 according to specified logic defined within transmit functionality 190.

Figure 8:
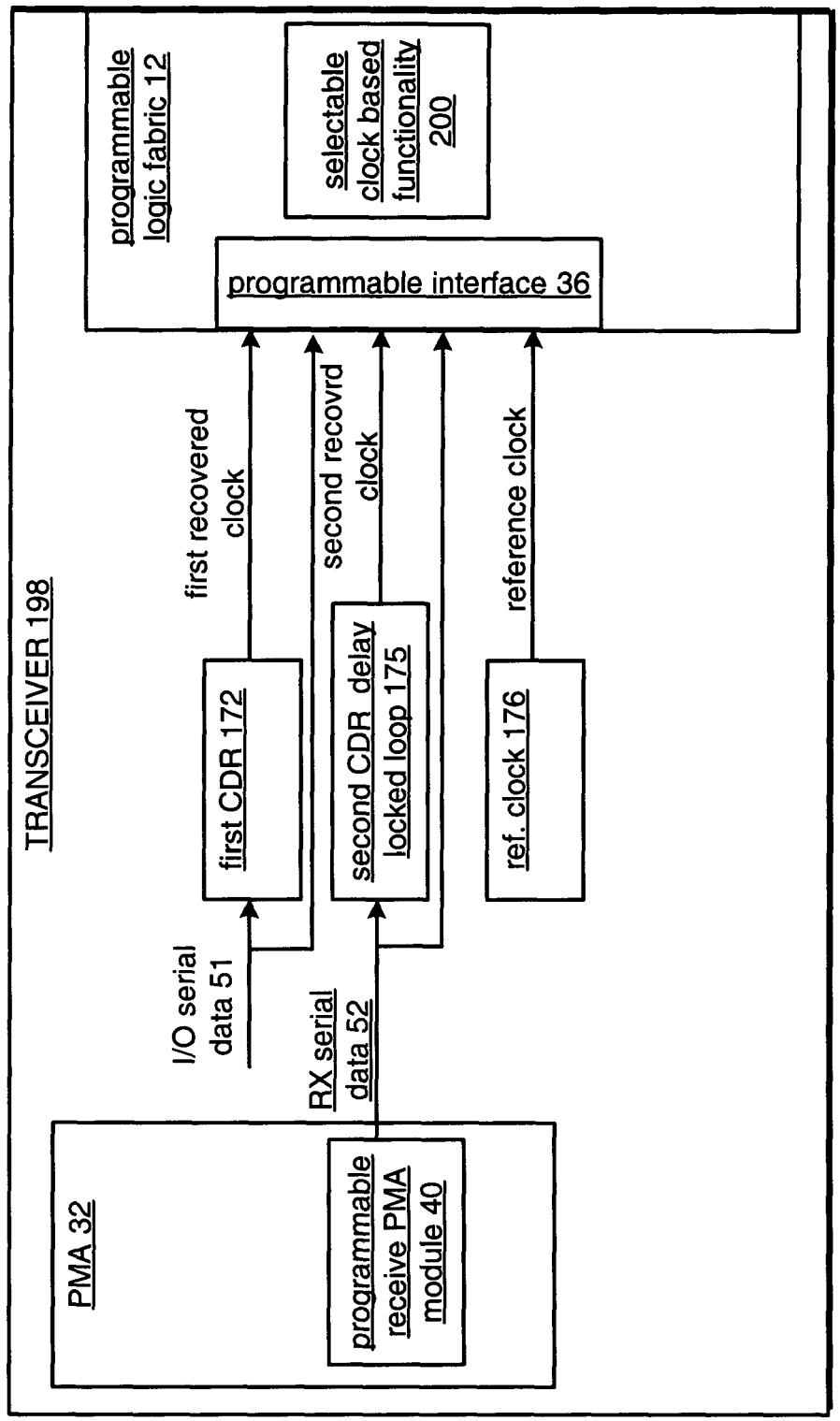
FIG. 8 is a functional block diagram of a transceiver that selects one of a plurality of clocks according to one embodiment of the invention wherein one of the plurality of clocks is a recovered clock for a TX serial data stream.

FIG. 8 is a functional block diagram of a transceiver 198 that selects one of a plurality of clocks according to one embodiment of the invention wherein one of the plurality of clocks is a recovered clock for an I/O serial data stream 51. Generally, I/O (input/output) serial data stream 51 represents any serial data stream including a received serial data stream, or an outgoing serial data stream being generated at a specified rate. A transceiver 198 includes a selectable clock based functionality 200 within programmable logic fabric 12 that selects from (i) a first recovered clock provided by a first clock and data recovery circuit 172 that recovers a clock from serial I/O stream 51 or (ii) a second recovered clock provided by delay locked loop circuit 174 that recovers a clock from an RX serial data stream 52 and that compensates for downstream phase shifts. While in some applications, merely using a reference clock for outgoing transmissions is adequate, the embodiment of FIG. 8 illustrates that, in some applications, it may be desirable to further synchronize a data operation with a recovered clock for the corresponding outgoing serial data. FIG. 8 also shows that delay locked loop (DLL) circuits may be used in place of CDR circuits for particular applications.

One application of each of the above described embodiments is that of a protocol translator. More specifically, referring to the embodiment of FIG. 8, an integrated circuit may include a clock recovery circuitry coupled to receive a high data rate input data stream for recovering a clock, based on the high data rate input data stream. While the high data rate input serial data stream is received according to a first protocol, the selectable clock based functionality translates the input serial data stream from the first protocol to a second protocol at a selected recovered clock rate of the input serial data stream. As the second protocol serial data stream is produced, its transmission rate may be one that corresponds to the recovered clock rate from the input serial data stream or a different rate based upon translation performance factors. Accordingly, the outgoing serial data stream may be transmitted at a TX clock rate or even at a rate that corresponds with a translation rate.

Figure 9:
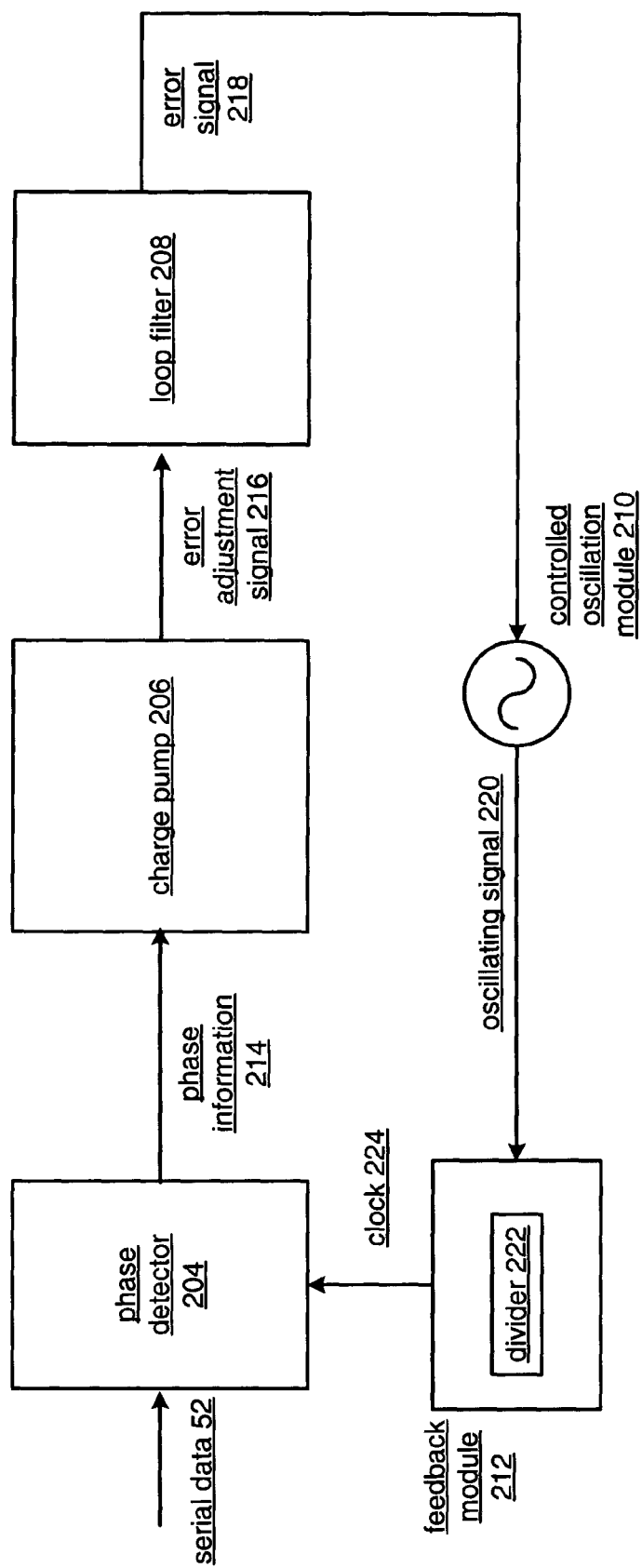
FIG. 9 is illustrates a block diagram of a clock and/or data recovery circuit in accordance with one embodiment of the present invention.

FIG. 9 is illustrates a block diagram of a clock and/or data recovery circuit 202 in accordance with one embodiment of the present invention. The clock recovery circuit 202 includes a phase detector 204, a charge pump 206, a loop filter 208, a controlled oscillation module 210, and a feedback module 212.

Clock recovery circuit 202 receives a serial data stream 52, which may be a high data rate bit stream transferring data at 10 or more gigabits per second. Phase detector 204 produces phase information 214 and error adjustment signal 216 based on the input serial data 52 and a feedback clock signal 224 (recovered clock). Operation of phase detector 204 is generally known by one of average skill in the art. Phase detector 204 produces phase information 214 to a charge pump such as charge pump 206. Charge pump 206 produces an error adjustment signal 216 based on the phase information 214. A loop filter 208 then produces an error signal 218 (a voltage signal) to an oscillation module 210. The controlled oscillation module 210 receives the error signal 218 and produces therefrom an oscillating signal 220. Feedback module 212 and divider 222 generate the feedback signal, which is the recovered clock signal 224, by dividing oscillating signal 220 by a divider value (could be "1", i.e., no division), and by converting the resulting oscillation to a digital signal to represent the recovered clock signal 224.

Figure 10:
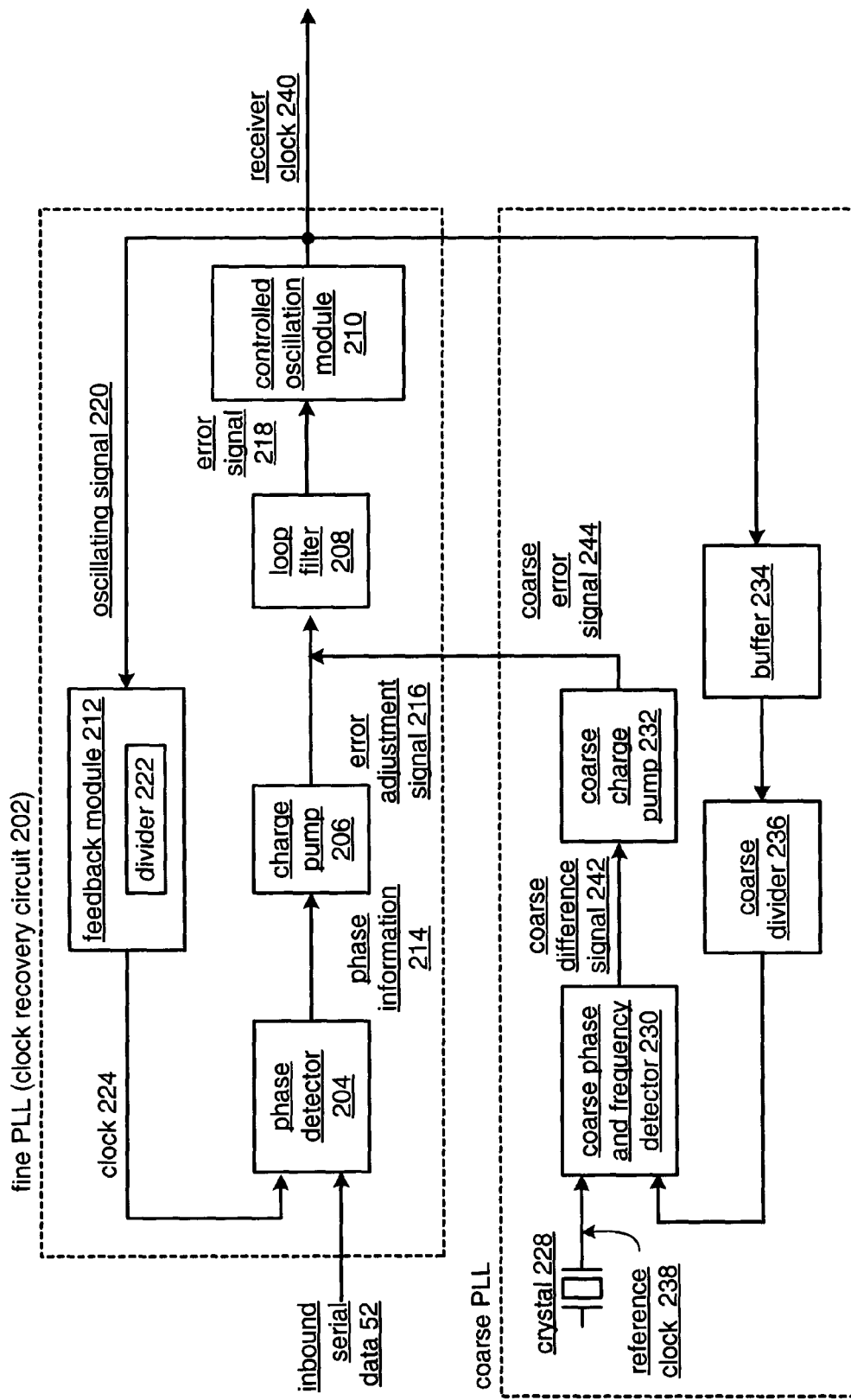
FIG. 10 illustrates a schematic block diagram of a clock data recovery block of a transceiver with a coarse and a fine phase-locked loop according to one embodiment of the present invention.
Figure 1:
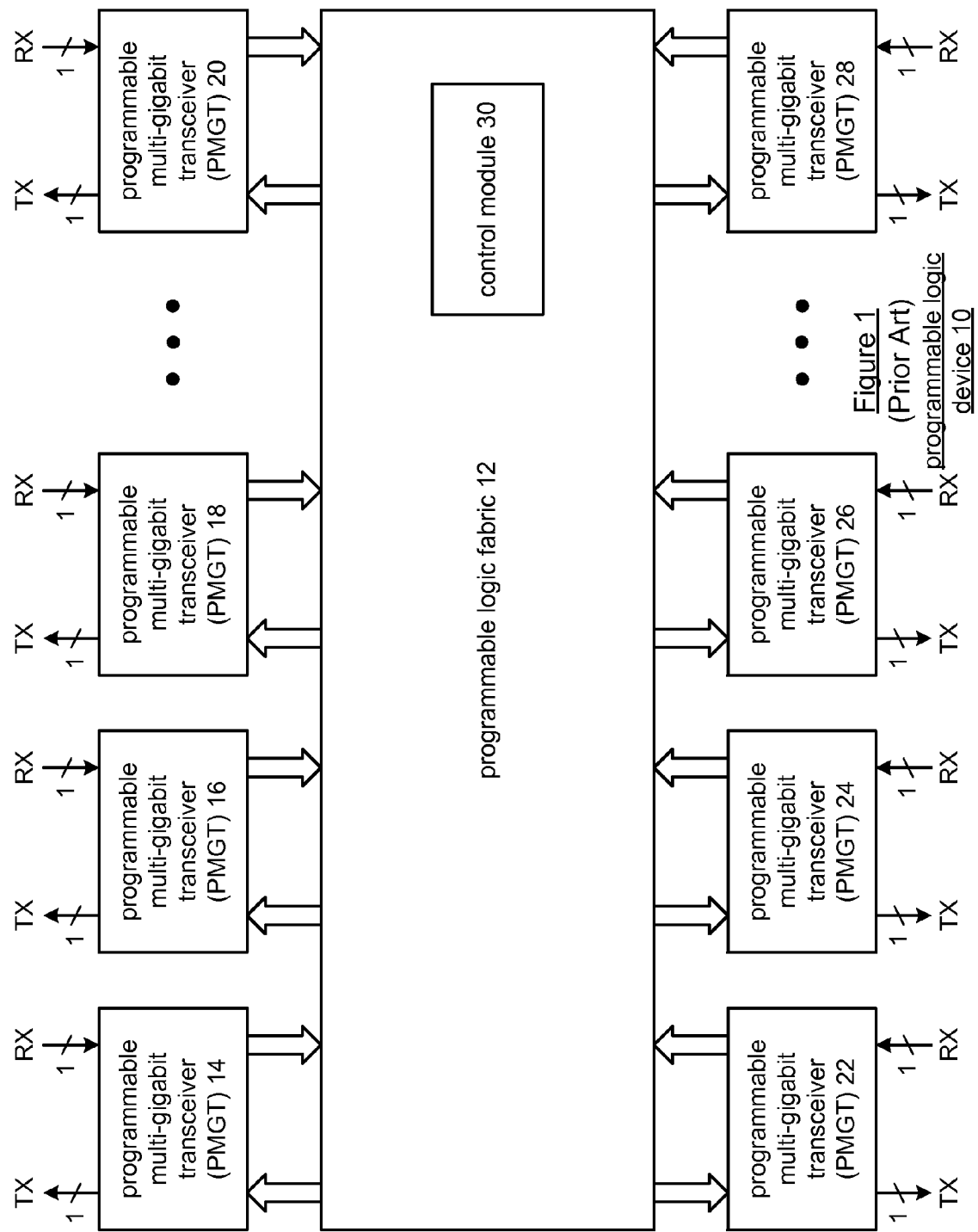
Figure 2:
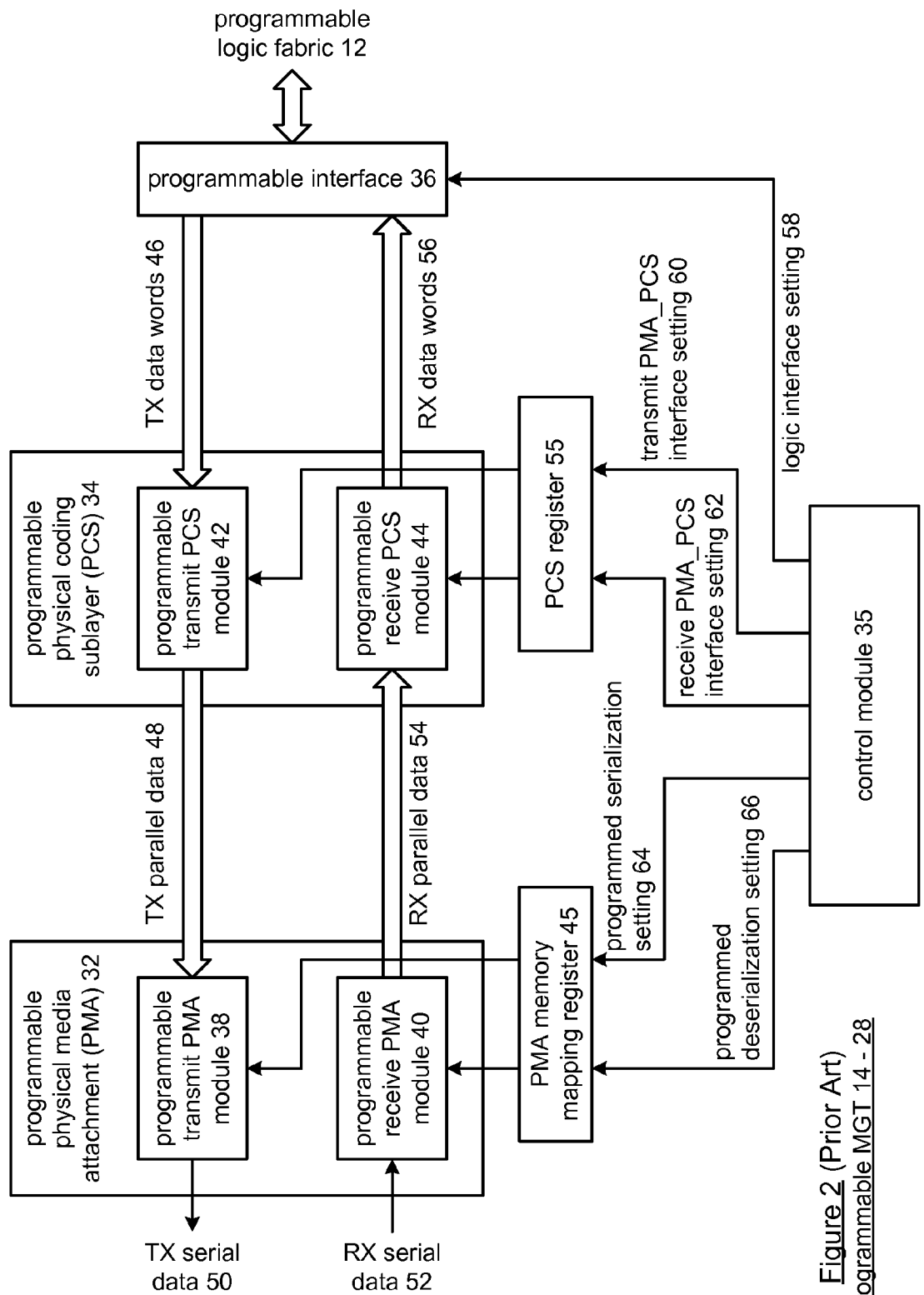

FIG. 10 illustrates a schematic block diagram of receiver clock data recovery block 226 of a transceiver according to one embodiment of the present invention. The clock data recovery block 226 includes a coarse PLL and a fine PLL. In general, the coarse PLL establishes the desired frequency for the clocking circuit and the fine PLL adjusts the phase of the clock and it will also adjust a limited frequency offset to align it with the incoming data. In the present embodiment of the invention, the feedback signal frequency provided by feedback module 212 is one-half the frequency of the inbound serial data 52. The coarse PLL includes a crystal oscillator 228 (including, if necessary, a clock multiplier), a coarse phase and frequency detector 230, a coarse charge pump 232, a buffer 234, and a coarse divider 236. The fine PLL, comprising clock recovery module 10 was described with reference to FIG. 9.

To establish the operating frequency for the clocking circuit, crystal oscillator 228 produces a reference clock 238 that is provided to the coarse phase and frequency detector 230. The coarse phase and frequency detector 230 determines the phase and frequency difference between the reference clock 238 and a divided representation of receiver clock 240. The coarse divider 236 provides the divided representation of the receiver clock 240 to the coarse phase and frequency detector 230 as a feedback signal. Based on the phase and frequency relationship of these signals, coarse phase and frequency detector 230 produces a coarse difference signal 242. Coarse charge pump 232 receives the coarse difference signal 242 and produces a current representation (which is converted to voltage through the transimpedance included at the output of the fine PLL charge pump 206 thereof and provides a coarse error signal 244 to controlled oscillation module 210 of the fine loop filter 208. Controlled oscillation module 210 receives the coarse error signal 244, and adjusts the oscillation frequency of receiver clock 240. Once the coarse PLL has established the operating frequency, the fine PLL becomes active and adjusts the phase of the receiver clock.

Controlled oscillation module 210 may utilize inductor-capacitor oscillators or ring oscillators to produce an output oscillation. If a inductor-capacitor oscillator is utilized, noise levels of controlled oscillation module 208 may be reduced.

As illustrated, clock data recovery block 226 includes two phase locked loops. One is a fine phase locked loop based on the inbound serial data 52 and the other is a coarse phase locked loop based on reference clock 238. Such a sequential phased locked loop system enables the receiver section to readily capture the inbound serial data 52. As one of average skill in the art will appreciate, clock data recovery block 226 may use single-ended signals or differential signals.

A plurality of methods of processing high data rate serial data utilizing the various embodiments of the transceivers illustrated in FIGS. 5-8 are illustrated in FIGS. 11-14. More specifically, FIG. 11 illustrates a method for processing high data rate serial data according to a first embodiment of the invention. Initially, the method includes receiving a high data rate input data stream at the transceiver (step 250) and recovering a clock based on the high data rate input data stream (step 252). Thereafter, the transceiver method includes providing the recovered clock to an FPGA (or other programmable logic) fabric portion (step 254) and performing subsequent processing in the FPGA portion based on the recovered clock (step 256).

One embodiment of the inventive method further includes receiving the high data rate input data stream according to a first protocol and converting the high data rate input data stream to a second protocol based on the recovered clock (step 258). Once the data stream is converted to a second protocol, it is then transmitted (step 260). The data may be transmitted based on the first recovered clock, a second recovered clock (for example, recovered from a transmitter clock) or any other clock, such as a reference clock.

FIG. 12 illustrates a method of processing high data rate serial data according to a second embodiment of the invention. The method initially includes receiving a first serial bit stream and recovering a clock from the first serial bit stream (step 262). Thereafter, the invention includes receiving a second serial bit stream and recovering a clock from the second serial bit stream (step 264). The transceiver of the present invention then provides the first and second recovered clocks and a reference clock to a circuit portion (step 266). Finally, the method includes, within the circuit portion, choosing among the first and second recovered clocks and the reference clock for subsequent processing for a specified functionality (step 268). As previously described, the circuit portion may be a fixed circuit or may be programmable logic fabric.

FIG. 13 illustrates a method of clock management according to a third embodiment of the invention. The clock management in a processing block of a transceiver device includes receiving a first data stream and recovering a first clock based on the first data stream (step 270) and providing the first recovered clock to a first circuit portion (step 272). Additionally, the transceiver may receive a second data stream and recover a second clock based on the second data stream (step 274), and may provide the second recovered clock to a second circuit portion (step 276). The transceiver may also provide a reference clock to a third circuit portion (step 278). Finally, the processing block may concurrently perform processing functions in using one or more of the first and second recovered clocks and the reference clock (step 280).

FIG. 14 illustrates a method of receiving and transmitting data high data rate serial data according to a fourth embodiment of the invention. Initially, the transceiver may receive a plurality of input data streams (step 282) and recover a corresponding plurality of clocks based on the plurality of input data streams (step 284). The transceiver may then determine at least one output port for providing outgoing data streams (step 286). The transceiver may then provide each input data stream to the at least one output port based upon a corresponding recovered clock (step 288). The method of providing the outgoing data streams to the at least one output port comprises, in one embodiment of the invention, providing the outgoing data streams to a number of output ports that corresponds to a number of input data streams wherein the method further includes determining, for each input data stream, an output port and providing the input data streams to the determined output ports at a corresponding recovered clock of the corresponding plurality of recovered clocks (step 290).

The invention disclosed herein is adaptable to various modifications and alternative forms. Therefore, specific embodiments have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A transceiver for processing high data rate serial data, comprising:

a first clock data recovery circuitry for receiving first serial data and recovering a first recovered clock from the first serial data, wherein the first clock data recovery circuitry receives the first serial data according to a first protocol;

a second clock data recovery circuitry for receiving second serial data and recovering a second recovered clock from the second serial data;

wherein the transceiver provides the first recovered clock, the second recovered clock, a reference clock, the first serial data and the second serial data to a plurality of clock based functionalities of the transceiver; and wherein each of the plurality of clock based functionalities performs processing of one of the first serial data and the second serial data in accordance with a clock chosen from among the first recovered clock, the second recovered clock and the reference clock, and wherein at least one of the plurality of clock based functionalities converts the first serial data to a second protocol based on the first recovered clock and transmits the first serial data, as converted, in the second protocol based on the second recovered clock.

2. The transceiver of claim 1 wherein said second clock data recovery circuitry comprises a delay locked loop circuitry for receiving said second serial data and produces said second recovered clock from the second serial data, wherein the transceiver provides the second serial data to the plurality of clock based functionalities and wherein each of the plurality of clock based functionalities uses one of the first recovered clock, the second recovered clock and the reference clock for processing of one of the first and second serial data.

3. The transceiver of claim 1 wherein the first serial data is a receive serial bit stream.

4. The transceiver of claim 1 wherein the plurality of clock based functionalities comprises a portion of a programmable logic fabric.

5. A transceiver for processing high data rate serial data, comprising:

a first circuitry for receiving first serial data and recovering a first recovered clock based on the first serial data, wherein the first circuitry provides the first recovered clock to a fabric comprising a first clock based functionality, a second clock based functionality, and a third clock based functionality, wherein the first circuitry receives the first serial data according to a first protocol;

a second circuitry for generating and providing a reference clock to the fabric;

a third circuitry for receiving second serial data and recovering a second recovered clock based on the second serial data, wherein the third circuitry provides the second recovered clock to the fabric; and wherein each of the first, second and third clock based functionalities concurrently performs processing functions on one of the first serial data and the second serial data in accordance with a clock chosen from among the first recovered clock, the second recovered clock, and the reference clock, and wherein at least one of: the first clock based functionality, the second clock based functionality, or the third clock based functionality, converts the first serial data to a second protocol based on the first recovered clock and transmit the first serial data, as converted, in the second protocol based on the second recovered clock.

6. A transceiver comprising:

a circuitry for receiving a plurality of input serial data streams, wherein the circuitry receives the plurality of input serial data streams according to a first protocol;

a clock data recovery circuitry for recovering a corresponding plurality of recovered clocks based on the plurality of input serial data streams;

a circuitry for providing a reference clock; and a logic for selecting from the plurality of input serial data streams and for providing at least one outgoing serial data stream to an outgoing transmit block;

wherein the logic provides each received input serial data stream of the plurality of input serial data streams to the outgoing transmit block in accordance with a clock chosen from among the plurality of recovered clocks and said reference clock, and wherein the logic converts at least one of the plurality of input serial data streams to a second protocol based on a first one of the plurality of recovered clocks and transmits the at least one of the plurality of input serial data streams in the second protocol based on a second one of the plurality of recovered clocks.

7. The transceiver of claim 6 wherein the outgoing transmit block is one of a programmable transmit physical media attachment (PMA) module and a transmitter port.

8. An integrated circuit, comprising:

at least one clock recovery circuitry coupled to receive a high data rate input data stream, wherein the at least one clock recovery circuitry recovers a plurality of recovered clocks based on the high data rate input data stream, wherein the at least one clock recovery circuitry receives the high data rate input data stream according to a first protocol; and a programmable fabric portion comprising a plurality of clock based functionalities, wherein each of the clock based functionalities performs processing on the high data rate input data stream in accordance with a clock chosen from among the plurality of recovered clocks and a reference clock, wherein the programmable fabric portion converts the high data rate input data stream to a second protocol based on a first one of the plurality of recovered clocks and transmits the high data rate input data stream, as converted, in the second protocol based on a second one of the plurality of recovered clocks.

9. The integrated circuit of claim 8 wherein the high data rate input data stream is received according to a first protocol and is converted to a second protocol by the programmable fabric portion based on one of said plurality of recovered clocks.

10. The integrated circuit of claim 9 further comprising a transmit circuitry coupled to receive the converted high data rate input data stream in the second protocol, wherein the programmable fabric portion provides the converted high data rate input data stream in the second protocol based on one of said plurality of recovered clocks.

11. The integrated circuit of claim 9 wherein said at least one clock recovery circuitry comprises a second clock recovery circuit for recovering a second recovered clock based on an I/O serial data stream.

12. A method of processing high data rate serial data, comprising:

receiving a high data rate input data stream;

recovering a first recovered clock based on the high data rate input data stream;

recovering a second recovered clock based on a transmitter clock;

providing the first and second recovered clocks to a programmable fabric portion comprising a plurality of clock based functionalities;

performing processing of the high data rate input data stream in each of the plurality of clock based functionalities in accordance with a clock chosen from among the recovered clocks, wherein the high data rate input data stream is received according to a first protocol and converted to a second protocol based on the first recovered clock; and transmitting the converted high data rate input data stream in the second protocol based on the second recovered clock.

13. A method of processing high data rate serial data, comprising:

receiving a first serial bit stream and recovering a first recovered clock from the first serial bit stream, wherein the first serial bit stream is received according to a first protocol;

receiving a second serial bit stream and recovering a second recovered clock from the second serial bit stream;

providing the first and second recovered clocks and a reference clock to a plurality of clock based functionalities;

within each of the plurality of clock based functionalities, choosing among the first and second recovered clocks and the reference clock for processing of one of the first serial bit stream and the second serial bit stream by each of the plurality of clock based functionalities;

converting the first serial bit stream to a second protocol based on the first recovered clock; and transmitting the first serial bit stream, as converted, in the second protocol based on the second recovered clock.

14. The method of claim 13 wherein the first serial bit stream is a receive serial bit stream.

15. The method of claim 13 wherein the second serial bit stream is a transmit serial bit stream.

16. A method of clock management in a processing block, comprising:

receiving a first data stream and recovering a first clock based on the first data stream, wherein the first data stream is received according to a first protocol;

providing the first clock to a fabric comprising a plurality of clock based functionalities;

receiving a second data stream and recovering a second clock based on the second data stream;

providing the second clock to the fabric;

providing a reference clock to the fabric;

concurrently performing processing functions on one of the first data stream and the second data stream in the processing block by choosing, by each of the plurality of clock based functionalities, a clock from among the first and second clocks and the reference clock;

converting the first data stream to a second protocol based on the first clock; and transmitting the first data stream, as converted, in the second protocol based on the second clock.

17. A method for receiving and transmitting data, comprising:

receiving a plurality of input data streams, wherein the plurality of input data streams is received according to a first protocol;

recovering a corresponding plurality of clocks based on the plurality of input data streams;

determining at least one output port for providing outgoing data streams;

providing each input data stream of the plurality of input data streams to the at least one output port in accordance with a clock chosen from among the plurality of recovered clocks and a reference clock;

converting at least one of the plurality of input data streams to a second protocol based on a first one of the plurality of clocks; and transmitting the at least one of the plurality of input data streams, as converted, in the second protocol based on a second one of the plurality of clocks;

wherein the at least one output port comprises a number of output ports that corresponds to a number of input data streams of the plurality of input data streams, and wherein the method further comprises determining, for each input data stream of the plurality of input data streams, an output port and providing each input data stream of the plurality of input data streams to the determined output ports based upon a chosen one of the plurality of recovered clocks and the reference clock.

* * * * *